United States Patent
Shake et al.

(10) Patent No.: US 6,587,242 B1
(45) Date of Patent: Jul. 1, 2003

(54) OPTICAL TRANSMISSION SYSTEM

(75) Inventors: Ippei Shake, Yokohama (JP); Hidehiko Takara, Boulder, CO (US); Yoshiaki Yamabayashi, Yokohama (JP); Osamu Kamatani, Houya (JP); Koji Nonaka, Yokosuka (JP); Kentaro Uchiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/422,726

(22) Filed: Oct. 22, 1999

(30) Foreign Application Priority Data

Oct. 27, 1998 (JP) .......................................... 10-305842
Oct. 27, 1998 (JP) .......................................... 10-305843
Mar. 25, 1999 (JP) .......................................... 11-082266

(51) Int. Cl.⁷ .......................... H04J 14/08; H04J 14/02; H04B 10/08; H04B 10/04

(52) U.S. Cl. ...................... 359/135; 359/110; 359/124; 359/123; 359/181; 359/182; 359/183

(58) Field of Search ................................ 359/135, 110, 359/124, 123, 181, 182, 183

(56) References Cited

U.S. PATENT DOCUMENTS 5,625,479 A * 4/1997 Suzuki et al. ................ 359/135
6,396,601 B1 * 5/2002 Takara et al. ................ 359/110

OTHER PUBLICATIONS

Tomizawa, M. et al., "STM–64 linearly repeatered optical transmission experiment using forward error correcting codes".
Japanese Patent Application, first publication: Publication No.: 10–229364 A.
Kawanishi, S. et al., "All–optical time–division–multiplexing of 100 Gbit/s signal based on four–wave mixing in a travelling–wave semiconductor laser amplifier".
Tomizawa, M. et al., "Nonlinear influence on PM–AM conversion measurement of group velocity dispersion in optical fibers".
Kuwahara, S. et al., "Adaptive dispersion equalization with the detection of dispersion fluctuation using PM–AM conversion for in–service high–speed, long–haul transmission systems".
Japanese Patent Application, first publication: Publication No.: 11–032008 A.
Uchiyama, K. et al., "100Gbit/s to 6.3 Gbit/s demultiplexing experiment using polarization–independent nonlinear optical loop mirror".
Andrekson, P.A. et al., "16 Gbit/s All–Optical Demultiplexing Using Four–Wave Mixing".

(List continued on next page.)

Primary Examiner—Jason Chan
Assistant Examiner—David C. Payne
(74) Attorney, Agent, or Firm—Burns, Doane, Swecker & Mathis, L.L.P.

(57) ABSTRACT

It is the object of the present invention to provide a transmission system that transmits a control signal corresponding to the overhead accommodating time division multiplexing information at a frequency that is the same (or nearly the same) as that of the main signal. In order to attain this object, an optical transmitter broadens in a time range the optical waveform of the OTDM signal having a wavelength $\lambda_0$ and the control light having a wavelength $\lambda_1(\approx\lambda_0)$, and multiplexes the signal light having an optical peak intensity set low compared to the OTDM signal peak intensity and sending this to an optical transmission fiber. An optical receiver provides a light splitting means that splits into two parts the transmitted OTDM signal and the control light and outputs one part thereof to an optical time division multiplexing means, and at the same time restores the control light included in the other part of the light to the original optical pulse train, and extracts the control information by converting this to an electric signal.

29 Claims, 24 Drawing Sheets

OTHER PUBLICATIONS

Salehi, Jawad A. et al, "Coherent Ultrashort Light Pulse Code–Division Multiple Access Communication Systems".

Takiguchi, K. et al., "Preliminary Experiments on Coherent Optical Code Division Multiple Access Using Arrayed–Waveguide Grating Pairs".

Hill, K. O., "Aperiodic Distributed–Parameter Waveguides for Integrated Optics".

Hirano, A. et al., "Optical signal processing using a high–speed saturable absorber optical gate and its application to optical discrimination and de–multiplexing".

Fermann, M.E., et al., "Nonlinear amplifying loop mirror".

Nonaka, K. et al., "Direct Optical Signal Processing Using Laser–Diode Switches".

Mamyshev, P. V., "All–optical Data Regeneration Based On Self–phase Modulation Effect".

Japanese Patent Application, first publication: Publication No.: 9–222622 A.

Doran, N. J. et al., "Nonlinear–optical loop mirror".

Kato, M., et al., "A Dispersion Tunable Fiber Bragg Grating Compensator Designed to Overcome Wavelength Drift".

Japanese Patent Application No. 10–229659.

Japanese Patent Application No. 10–135337.

* cited by examiner

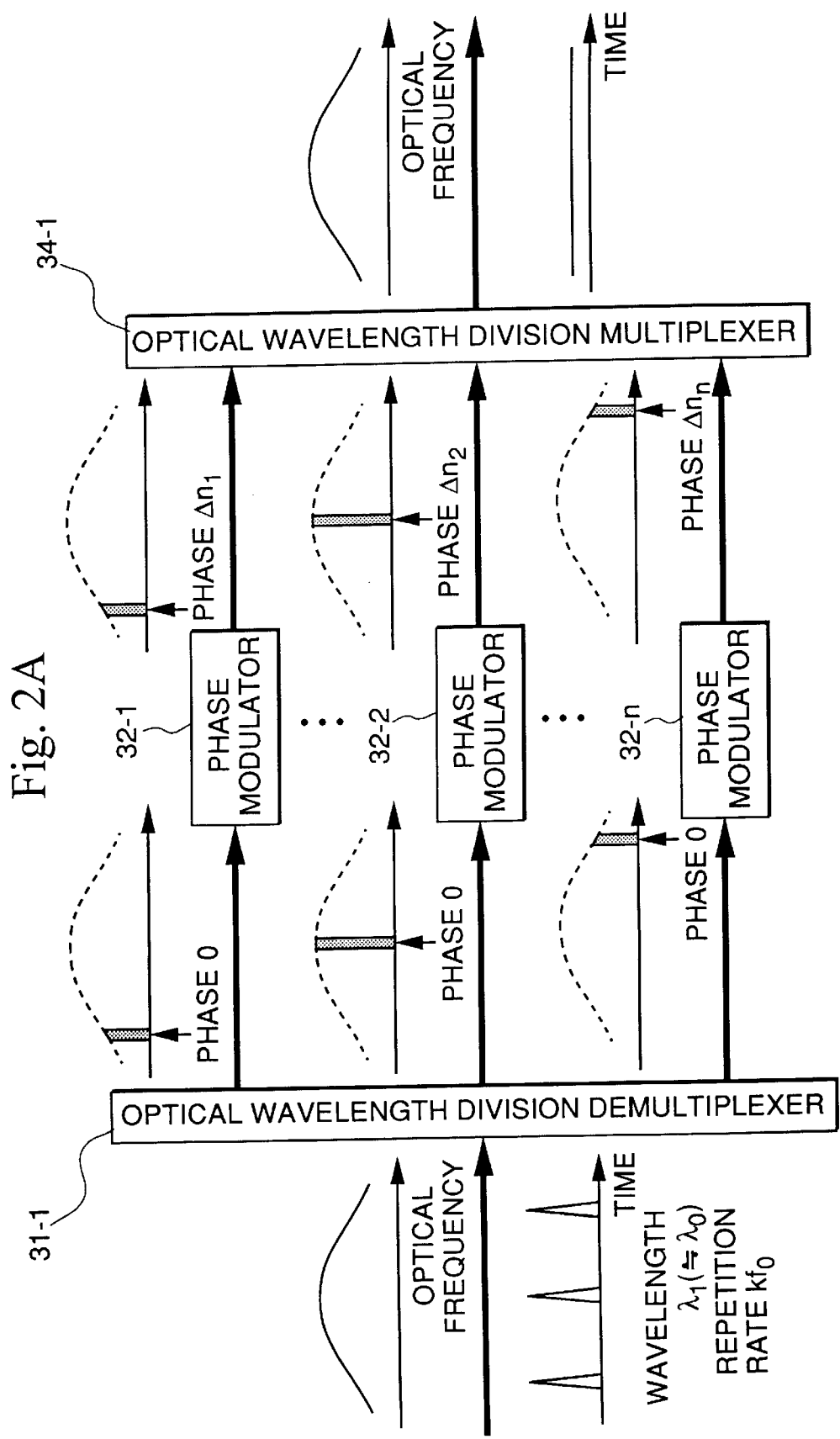

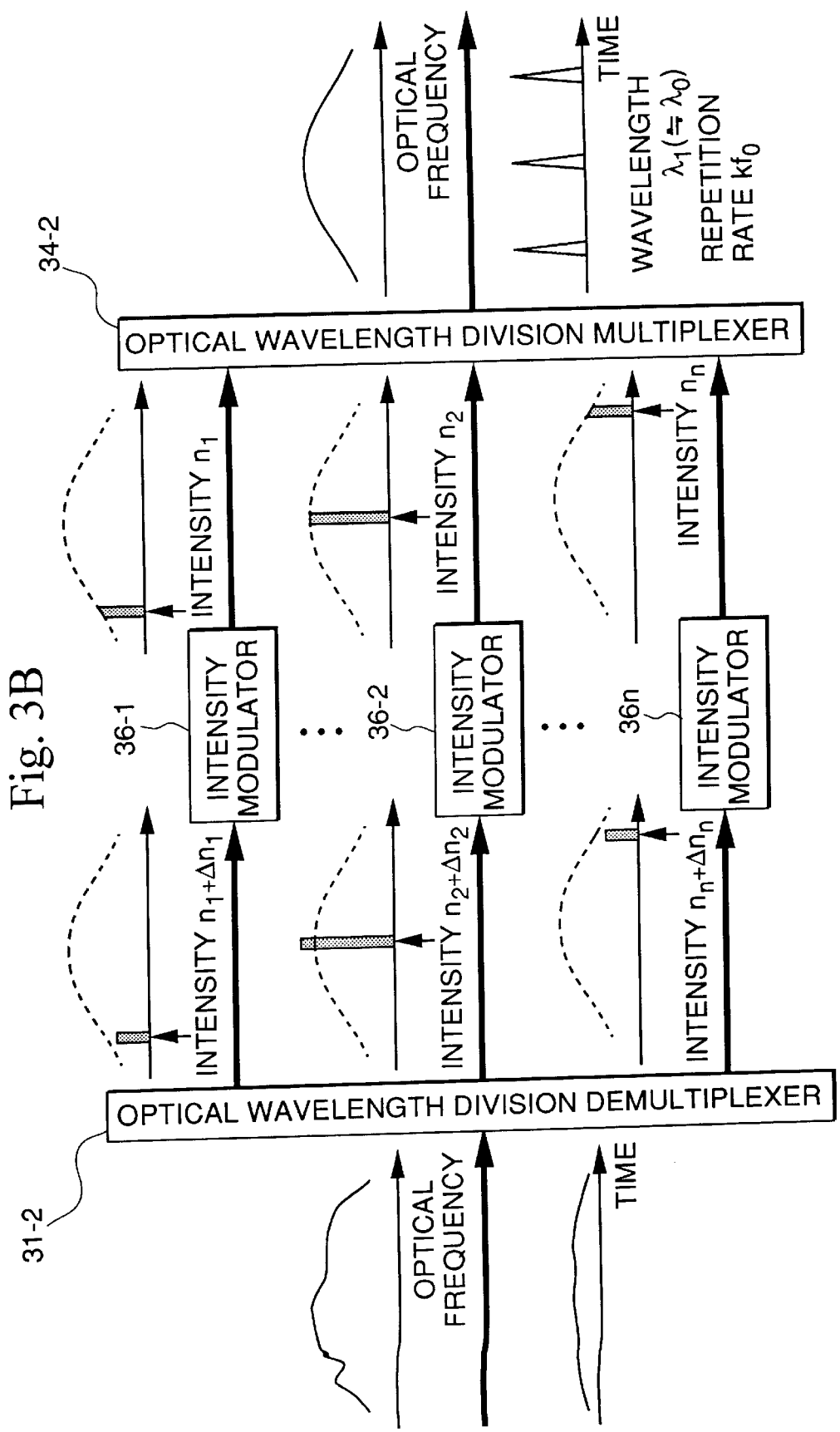

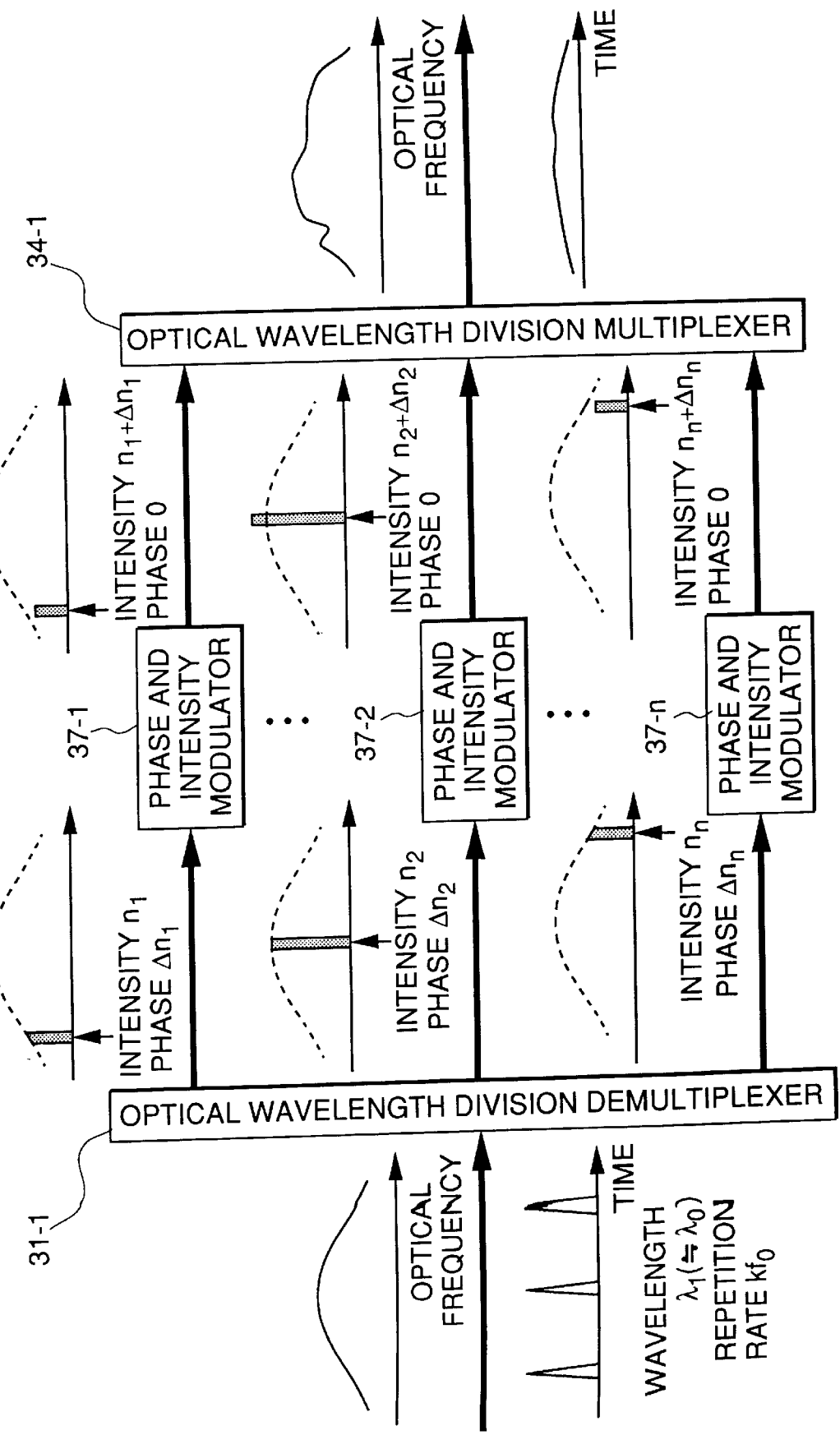

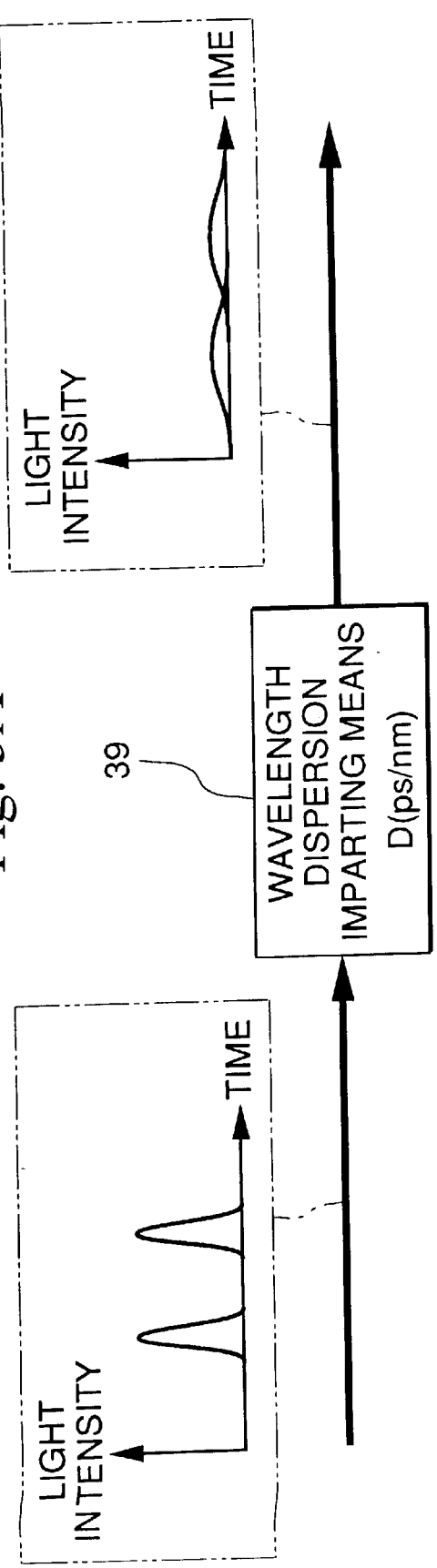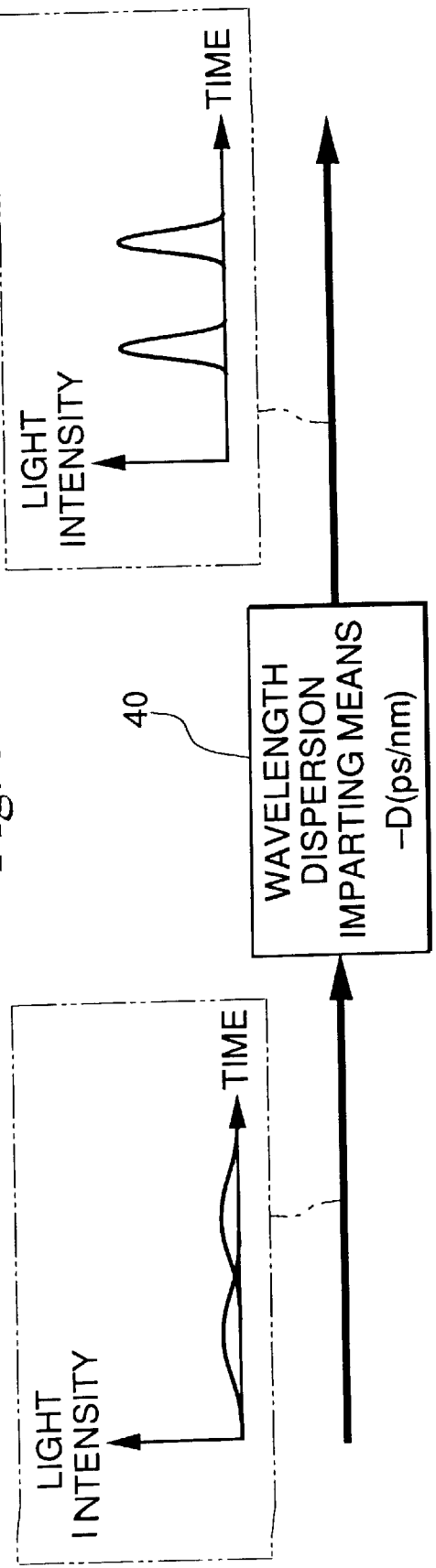

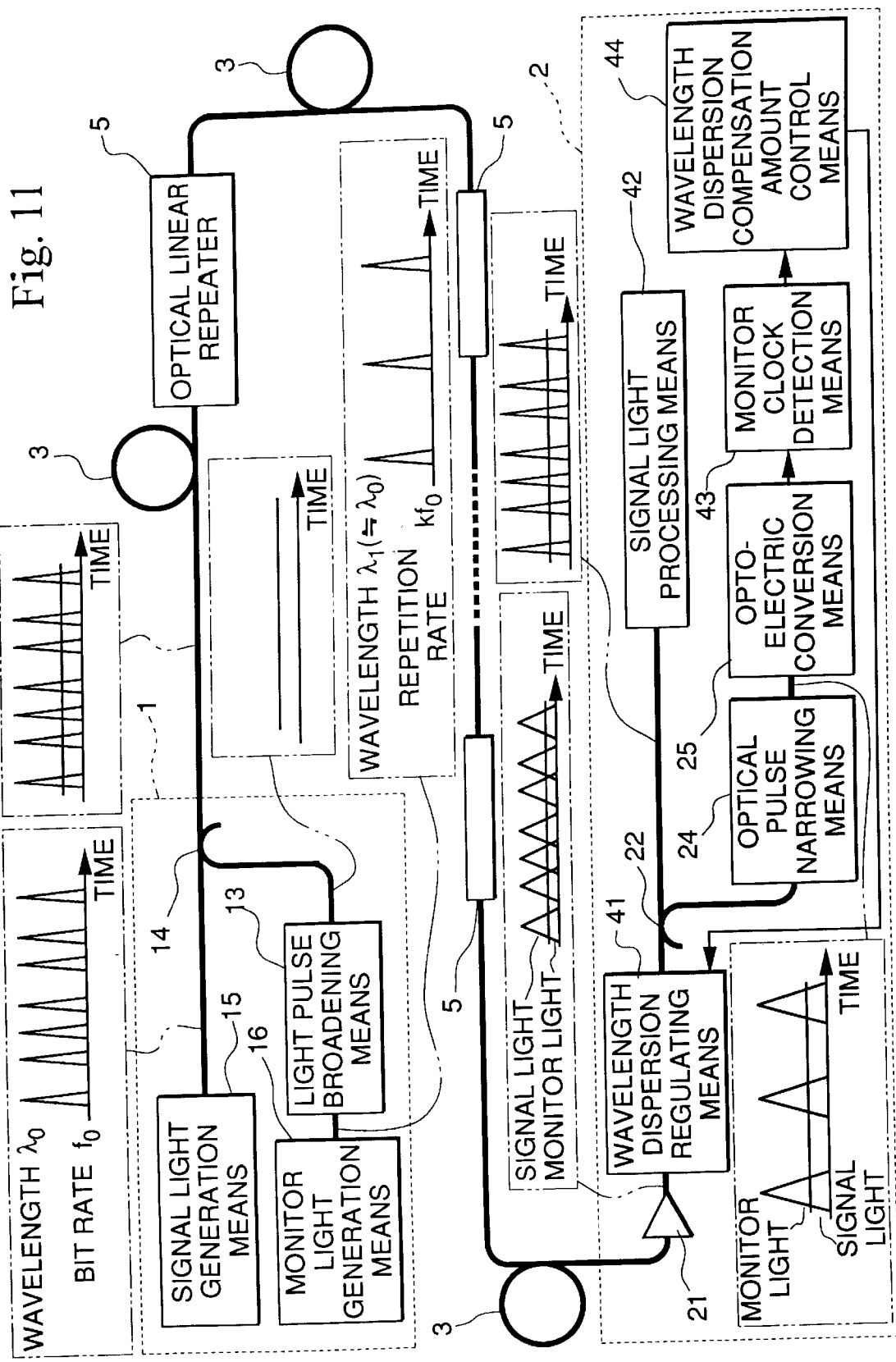

Fig. 19 (PRIOR ART)
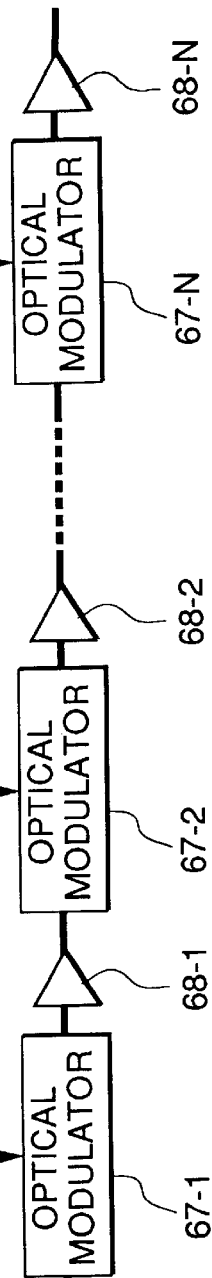
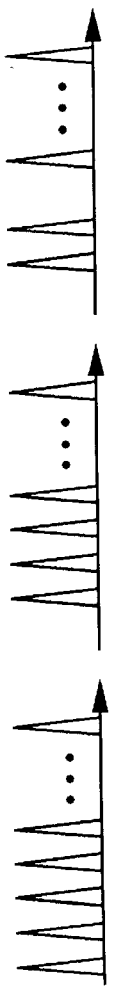

OPTICAL TRANSMISSION SYSTEM

BACKGROUND OF THE INVENTION

1. Field of the Invention

The present invention relates to an optical transmission system that transmits an OTDM signal (optical time division multiplexed signal) via an optical transmission fiber and one or both of an optical linear repeater and an optical regenerator repeater, and wherein a control signal carrying transmission quality monitoring information, frame information, multiplexed signal channel information, etc., is transmitted by being multiplexed with an OTDM signal.

In addition, the present invention relates to an optical transmission system that transmits an optical signal via an optical transmission fiber and optical linear repeaters, and wherein monitor light used in wavelength dispersion compensation of the transmission path is transmitted by being multiplexed with signal light.

2. Background Art

In an optical transmission system, transmission quality monitoring, frame synchronization, and extracting multiplex signal channels are very important. In conventional electrical time division multiplexing (ETDM) that multiplexes channels with a plurality of lines at the electrical stage, the transmission quality monitoring information, frame information, and multiplexed signal channel information corresponding to each of these functions are accommodated in the overhead of the SDH frame, and by electrical signal processing after conversion of the signal light into an electrical signal by a light receiver, transmission quality monitoring, frame synchronization, and channel extraction are carried out. In addition, a method of improving transmission characteristics consists in lowering the error rate by adding a forward error correction code (see M. Tomizawa et al., "STM-64 linearly repeating optical transmission experiment using forward error correcting codes", in Electron. Lett., Vol. 31, No. 12, pp. 1001–1003, 1996.)

In contrast, in optical transmission systems, one method of improving the transmission speed is optical time division multiplexing (OTDM), which multiplexes a plurality of an optical short pulses while offsetting the timing along the time axis. Furthermore, for optical time division multiplexing, there is the parallel form shown in FIG. 18 (see Japanese Unexamined Patent Application, First Publication, No. Hei 10-229364, "Optical Pulse Multiplexing Apparatus") and the serial form shown in FIG. 19 (see S. Kawanishi et al., "All-optical time-division-multiplexing of 100 Gbit/s signal based on four-wave mixing in a travelling-wave semiconductor laser amplifier", Electron. Lett., Vol. 33, No. 11, pp. 976–977, 1997).

In FIG. 18, the optical pulse train of the repetition rate $f_0$ is split into N parts by an optical splitter 61, and input into respective optical modulators 62-1~62-N. The optical signals modulated by each optical modulator are respectively amplified by optical amplifiers 63-1~63-N, have a different delay imparted by optical delay devices 64-1~64-N, and are coupled by an optical coupler 65. Thereby, an OTDM signal having a bit rate of $Nf_0$ is generated. When the bit rates of all the lines are equal, this structure can generate an OTDM signal that time division multiplexes N lines of optical signals having arbitrary bit rates by respectively multiplying the optical pulse train having a fundamental frequency $f_0$ split into N parts, in the case that the N lines of a modulated signal having has a bit rate $m_i f_0$ (i=1, 2, . . . , N, and $m_i$ is an integer equal to or greater than 1).

In FIG. 19, an optical pulse train having a repetition rate $\Sigma m_i f_0$ is generated by a high speed optical pulse train generating means 66, and modulated by an optical modulator 67-1 using a modulation signal having a bit rate of $m_1 f_0$, and amplified by optical amplifier 68-1. In the following manner, it is possible to generate an OTDM signal that has a time division multiplexed signal light of N lines by sequential modulation using modulation signals respectively having bit rates $m_i f_0$ with each modulator.

In addition, in optical transmission systems, one of the main factors causing deterioration of transmission characteristics is the wavelength dispersion of the optical transmission path. When this wavelength dispersion is large, because the waveform of the signal light is distorted, intersymbol interference causes bit errors. The influence of this increases as the transmission speed increases. Therefore, when constructing an optical transmission system, it is necessary to understand the wavelength dispersion characteristics of the optical transmission path and carry out dispersion compensation.

A conventional means for measuring wavelength dispersion when implementing a system, as shown in FIG. 20, is measuring the zero-dispersion wavelength of the optical transmission path using a PM-AM converter, and using this to determine the amount of wavelength dispersion (see M. Tomizawa, et al., "Nonlinear influence on PM-AM conversion measurement of group velocity dispersion in optical fibers", Electron. Lett, Vol.30, No.17, pp. 1434–1435,1994).

In FIG. 20, CW light having a wavelength $\lambda_1$ output from the monitor light generation means 71 of the optical transmitter is input into an optical phase modulation means 72, and monitor light having applied a phase modulation of frequency $\omega_1$ is sent to the optical transmission fiber 73. The monitor light is sent via an optical transmission fiber 73 and an optical linear repeater 74, amplified by the optical amplifier 75 of the optical receiver, and received by an optoelectric conversion means 76. At this time, due to the wavelength dispersion that the monitor light undergoes in the optical transmission fiber 73, an intensity modulation component of frequency $\omega_1$ depending on phase modulation appears.

Because this intensity amplitude depends on the amount of wavelength dispersion the light of frequency $\lambda_1$ receives over the entire optical transmission fiber, if intensity amplitude information from an electric signal output from the optoelectric conversion means 76 of the monitor clock detection means 77 is extracted, the average amount of the wavelength dispersion over the entire optical transmission fiber can be known. This information is fed back to the monitor light generation means 71 using the wavelength dispersion compensation amount control means 78, and by carrying out the same measurement a number or times by changing the wavelength of input light, it is possible to set an arbitrary wavelength that is suited for the optical transmission fiber that has been introduced into the system. Normally, by matching the average zero dispersion wavelength of the optical transmission fiber as a whole, it is possible to minimize the amount of dispersion of the optical transmission fiber.

However, in high speed transmission systems of 40 Gbit/s or greater, adjusting dispersion equalization that optimally compensates the wavelength dispersion in real time is necessary as a measure against time dependent fluctuation of the wavelength dispersion due to temperature fluctuation. As a conventional applied dispersion equalization method used while a system is in operation, a method, as shown in FIG. 21, has been proposed in which monitor light having a wavelength differing from that of the signal light is wavelength multiplexed with the signal sight and transmitted, the monitor light only is separated by a wavelength filter from the wavelength multiplexed light optically split at the receiver, and the amount of wavelength dispersion is measured (see Kuwahara et al., "Study of adjusting dispersion equalization by dispersion fluctuation detection using the PM-AM conversion effect", Electronic Information Communication Association Technical Research Report OCS 98-5 [in Japanese]).

In FIG. 21, the signal light generation means 81 outputs a signal light having a wavelength $\lambda_0$. The monitor light generation means 82 outputs a CW light having a wavelength of $\lambda_1$ ($\neq \lambda_0$), and the optical phase modulation means 83 generates monitor light by applying a phase modulation of frequency $\omega_1$ to the CW light. The signal light and the monitor light are multiplexed by the optical coupling means 84, and transmitted via an optical transmission fiber 85 and an optical linear repeater 86. At this time, the pulse width of the signal light broadens due to the wavelength dispersion received from the entire optical transmission fiber, and an intensity modulation component having frequency $\omega_1$, which depends on the phase modulation, appears in the monitor light.

The transmitted signal light and monitor light are amplified by the optical amplifier 87 of the optical receiver, and split into two parts by the optical splitting means 88. One of the parts is input into the optical band pass filter 89 that passes a wavelength $\lambda_1$ and thereby only the monitor light is extracted, while the signal light is transmitted. This monitor light is converted into an electrical signal by the optoelectric conversation means 90. Because the intensity amplitude of the monitor light is dependent on the amount of wavelength dispersion the light of wavelength $\lambda_1$ receives over the entire optical transmission fiber, if intensity amplitude information is extracted from the electric signal output from the optoelectric conversion means 90 at the monitor clock detection means 91, the amount of the average wavelength dispersion of the entire optical transmission fiber can be known. This information is fed back to the monitor light generation means 82 using the wavelength dispersion compensation amount control means 92, and by carrying out the same measurement a number or times by changing the wavelength of input light, it is possible to set an optimal transmission wavelength by tracking the zero dispersion wavelength fluctuation while the system is in operation.

In this connection, in the conventional OTDM format, an optical pulse signal is only multiplexed and dispersed on a time axis, and does not have the overhead that ETDM does. Therefore, there has been almost no study of monitoring transmission quality and frame synchronization, extraction of multiplexed channels, or the transmission of forward error correcting codes.

In contrast, a method of transmitting forward error correction codes without using overhead or redundant bit sequences has been proposed. This method restricts the bit rate increase due to the foreword correction bit sequence of the main signal by wavelength multiplex transmission of the forward error correction code by a control signal having a wavelength that differs from the main signal (see Japanese Unexamined Patent Application, First Publication, No. Hei 11-32008, "Optical Transmission Apparatus"). For example, control information is carried and transmitted on the monitor light shown in FIG. 21, and when this method is used, forward error correction without overhead is possible for the OTDM format as well.

However, in the wavelength multiplex transmission of the main signal and the control signal, because two waves must transit the optical band pass filter provided in the optical linear repeater, compared to the bit rate of the main signal, a broad bandwidth is necessary. Due to this, there is the problem that the exclusion effect of the ASE (amplified spontaneous emission) the optical amplifier generates is reduced, and the transmission characteristics deteriorate. Furthermore, the faster the bit rate becomes, the larger the influence of the wavelength dispersion of the optical transmission fiber becomes, and the phase difference between the two waves of the main signal and the control signal exceeds one bit. Thus there is the problem that correct forward error correction cannot be carried out.

It is an object of the present invention to provide an optical transmission system that can transmit control signal light corresponding to the overhead accommodating the transmission quality monitoring information, frame information, multiplexed signal channel information, etc., at the same (or nearly the same) wavelength as the OTDM signal.

In addition, as shown in FIG. 21, in an optical transmission system that transmits by wavelength multiplexing a signal light having a wavelength of $\lambda_0$ and monitor light having a wavelength of $\lambda_1$ and carries out wavelength dispersion compensation using the monitor light, the wavelength dispersion compensation is always to the monitor light wavelength, the offset of the amount of wavelength dispersion of the monitor light wavelength and the signal light wavelength is known in advance, and based on this, control of the signal light wavelength of the signal light generation means 81 was necessary.

In addition, in order to wavelength multiplex and transmit the signal light wavelength and the monitor light having a difference wavelength, as described above, wide band characteristics were required of the optical linear repeater 86. Due to this, the influence of ASE generated by the optical amplifier becomes large, and there is the concern of the deterioration of the signal characteristic.

SUMMARY OF THE INVENTION

It is an object of the present invention to provide an optical transmission system that monitors the amount of wavelength dispersion using monitor light having the same (or nearly the same) wavelength as the signal light, and always carries out optical wavelength dispersion compensation.

In order to solve the above-described problems, the first aspect of the invention is characterized in an optical transmitter providing: an optical time division multiplexed signal generating means that outputs an OTDM signal having a wavelength $\lambda_0$ that has a time division multiplexed signal light having N lines and having a bit rate $m_f f_0$ that is an integral multiple of the fundamental frequency $f_0$, a control light generation means that generates control signal light wherein an optical pulse train, having a wavelength $\lambda_1$ equal or almost equal to the wavelength of the OTDM signal and having a bit rate $kf_0$ that is an integral multiple of the fundamental frequency $f_0$ or a bit rate $f_0/k$ that is a unit fraction of an integral number of the fundamental frequency $f_0$ that are synchronized with the OTDM signal, is modulated by control information of said OTSM signal, an optical pulse broadening means that broadens the optical pulse waveform of the control signal in a time range, and outputs a control signal having an optical peak intensity set sufficiently low in comparison to the OTDM signal peak intensity, and an optical coupling means that multiplexes the OTDM signal and the control light and delivers them to the optical transmission fiber. Furthermore, the first invention is characterized in an optical receiver providing: a light splitting means that splits into two parts the transmitted light, an optical pulse narrowing means that restores the control light induced in a part of the light split by the optical splitting means to the original optical pulse train, an optoelectric conversion means that converts the output light of the optical pulse narrowing means to an electric signal, a control signal processing means that extracts from the electrical signal information relating to the optical time division multiplexing of the OTDM signal and control information such as the timing clock, etc., and an optical time division multiplexing means that, depending on the control information, carries out optical time division demultiplexing of the OTDM signal included in other portion of light split into an N line signal light by the optical splitting means.

The optical transmission system of the first aspect of the invention can transmit control signals corresponding to the overhead accommodating transmission quality monitoring information, frame information, multiplexed signal channel information, etc, at the same or nearly the same wavelength as the OTDM signal. In addition, using an optical linear repeater or an optical regenerator repeater, it is possible to use an optical band pass filter having the minimal necessary bandwidth through which the OTDM signal and the control light can pass, and it is possible to realize transmission characteristics that are little influenced by the ASE generated by optical amplifiers.

Furthermore, for each optical linear repeater, by improving the S/N ratio of the OTDM signal and the control signal, it is possible to reduce the influence of non-linear optical effects such as self-phase modulation and inter-bit four wave mixing light, and it is possible to implement long distance transmission.

In addition, the first aspect of the invention is characterized in providing in a part or all of a plurality of optical linear repeaters: an optical splitting means that splits transmitted light into two parts, a first optical signal regeneration means that regenerates the OTDM signal included in one part of the light split by the optical splitting means, an optical pulse narrowing means that restores the control signal included in the other part of the light split by the optical splitting means to the original optical pulse train, a second optical pulse regenerating means that regenerates the optical pulse train of the control light output from the optical pulse narrowing means, an optical pulse broadening means that broadens the optical pulse waveform of the regenerated control light in a time range, and outputs the control light having an optical peak intensity set sufficiently low compared to the OTDM signal peak intensity, and an optical coupling means that multiplexes the regenerated OTDM signal and the control light and delivers them to the optical transmission fiber.

The optical transmission system of the second aspect of the invention is characterized in an optical transmitter providing: an signal light generation means that generates signal light having a wavelength $\lambda_0$ and a bit rate $f_0$, a monitor light generating means that generates monitor light of an optical pulse train having a wavelength $\lambda 1$ equal to or almost equal to the wavelength of the signal light and having a repetition rate $f_1$, an optical pulse broadening means that outputs monitor light having an optical peak intensity set sufficiently low compared to the signal light peak intensity, and an optical coupling means that multiplexes signal light and monitor light output from the optical pulse broadening means and delivers the monitor light to the optical transmission fiber. Furthermore, the optical transmission system of the second invention is characterized in an optical receiver providing: a wavelength dispersion adjustment means that provides wavelength dispersion to the delivered light, an optical splitting means that splits into two parts the output light of the wavelength dispersion adjustment means and outputs one part to a signal light processing means that carries out reception processing of the signal light, an optical pulse narrowing means that restores the monitor light included in the other part of the light split by the optical splitting means to the original optical pulse train, an optoelectric conversion means that converts the output light of the optical pulse narrowing means into an electric signal, a monitor clock detection means that detects the clock component of the monitor light from the electric signal, and a wavelength dispersion compensation amount control means that controls the wavelength dispersion compensation amount of the wavelength dispersion adjustment means so that the clock component is maximized.

According to the second aspect of the invention, it is possible to monitor the wavelength dispersion compensation amount using monitor light having the same or nearly the same wavelength as the signal light, and always maintain it at the optimal value. Furthermore, with an optical linear regenerator it is possible to use an optical band pass filter having the lowest necessary bandwidth to transmit the signal light and the monitor light, and it is possible to realize transmission characteristics that are little influenced by the ASE generated by optical amplifiers.

In addition, the second aspect of the invention is characterized in a structure in which a wavelength dispersion compensation amount control means controls the wavelength of the signal light generating means and the monitor light generating means of the light transmitter so that the clock component detected by the monitor detection means is largest, instead of providing a wavelength dispersion adjustment means in the optical receiver.

Furthermore, the second aspect of the invention is characterized providing in a part or all of a plurality of optical linear repeaters: a wavelength dispersion adjustment means that provides wavelength dispersion to the delivered light, an optical splitting means that splits into two parts the output light of the wavelength dispersion adjustment means and outputs this part to the optical transmission fiber, an optical pulse narrowing means that restores the monitor light included in the other part of the light split by the optical splitting means to the original optical pulse train, an optoelectric conversion means that converts the output light of the optical pulse narrowing means to an electric signal, a monitor clock detection means that detects the clock component of the monitor light from the electric signal, and a wavelength dispersion compensation amount control means that controls the wavelength dispersion compensation amount of the wavelength dispersion adjustment means so that the clock component is maximal.

BRIEF DESCRIPTION OF THE DRAWINGS

FIG. 2A is a drawing showing an example of a first structure of the optical pulse broadening means 13 (encoding method).

FIG. 3B is a drawing showing an example of a second structure of the optical pulse narrowing means 24 (encoding method).

FIG. 4A is a drawing showing an example of a third structure of the optical pulse broadening means 13 (encoding method).

FIG. 5A is a drawing showing an example of a fourth structure of the optical pulse broadening means 13 (wavelength dispersion application method).

FIG. 5B is a drawing showing an example of a fourth structure of the optical pulse narrowing means 24 (wavelength dispersion application method).

FIG. 11 is a block diagram showing a sixth embodiment of the optical transmission system of the present invention.

FIG. 19 shows an example of the structure (serial type) of the time division multiplexing signal generation means.

DETAILED DESCRIPTION OF THE INVENTION

Figure 1:
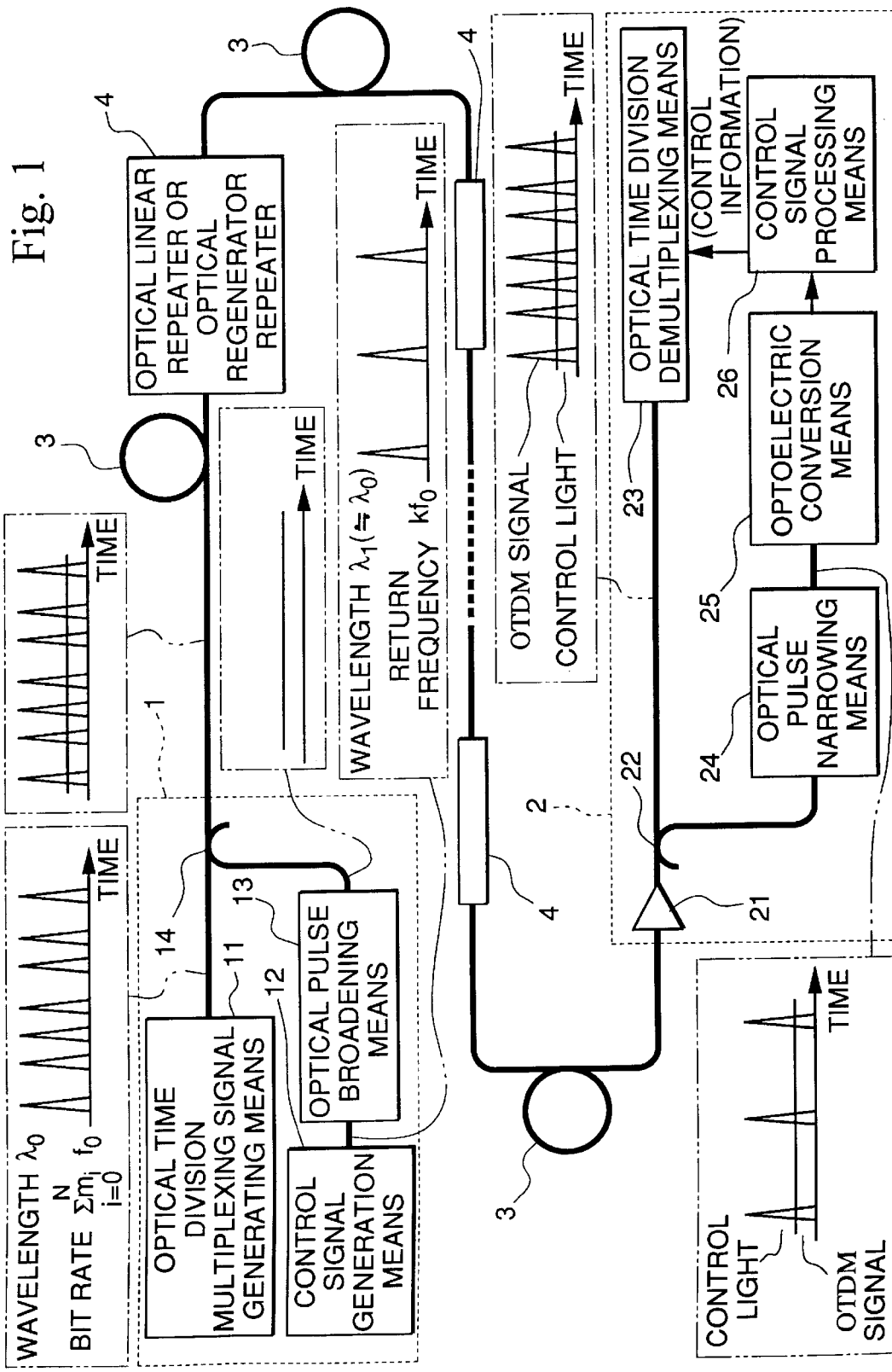
FIG. 1 is a block diagram showing a first embodiment of the optical transmission system of the present invention.

FIG. 1 shows a first embodiment of the optical transmission system of the present invention.

In the figure, the optical transmitter 1 and the optical receiver 2 are connected via the optical transmission fiber 3 and the optical linear repeater or an optical regenerator repeater. The optical transmitter 1 is constructed from an optical time division multiplexing signal generating means 11, a control light generation means 12, an optical pulse broadening means 13, and an optical coupling means 14. The optical receiver 2 is constructed from an optical amplifier 21, an optical splitting means 22, an optical time division demultiplexing means 23, an optical pulse narrowing means 24, an optoelectric conversion means 25, and a control signal processing means 26.

The time division multiplexing signal generating means 11, using the same structure as the conventional one, outputs an OTDM signal having a wavelength $\lambda_0$ and a bit rate $\Sigma m_i f_0$. The control light generating means 12 generates an optical pulse train having a wavelength of $\lambda_1(\neq\lambda_0)$ and a repeating frequency $kf_0$ that is an integral multiple of the fundamental frequency synchronous to the OTDM signal, and outputs it after intensity modulation or phase modulation by information related to optical time division multiplexing (the head position of the frame, the bit rate of each channel, the arrangement of the channels, etc.) and transmission quality monitoring information, etc. In addition, the control light can be intensity modulated or phase modulated so that the control light has a timing clock component that is an integral multiple of $hf_0$ (h is an integer equal to or greater than 1) of the fundamental frequency.

In the control light generating means 12, the optical time division multiplexing signal generating means 11 can generate the optical pulse train from a different pulse light source, and can use the optical pulse train having a repetition rate $f_0$ from the pulse light source of the optical time division multiplexing signal generating means 11 and obtained by splitting using the optical splitting means, or an optical pulse train that is a multiple or fraction of this.

The optical pulse broadening means 13 broadens the optical pulse waveform of the control light in a time range, and outputs a control signal having a peak intensity sufficiently low compared to the peak intensity of the OTDM signal. The OTDM signal and the control light are multiplexed by the optical coupling means 14, and delivered via the optical transmission fiber 3 and the optical linear repeater or the optical regenerator repeater 4. Moreover, when the control signal light carries the frame information of the OTDM signal and the forward error correction code, it is necessary to design the optical transmitter 1 so that this part conforms to the frame phase of the OTDM signal during multiplexing.

In addition, the polarization relation between the OTDM signal and the control light can be arbitrary when incident on the optical coupling means 14, but in particular if it is set so that each is in a mutually orthogonal state to the other, it is possible to minimize the interference between the OTDM signal and the control light.

In addition, it is possible to use an optical band pass filter having a minimum bandwidth in the optical linear repeater or the optical regenerator repeater because the OTDM signal and the control light have almost the same wavelength. Thereby, in comparison with the conventional method using a control light having a wavelength different from that of the OTDM signal, it is possible to cut out with good efficiency the ASE generated by the optical amplifiers, and thus improve the transmission characteristics.

The transmitted OTDM signal and the control light are split into two parts by the optical splitter 22 after being optically amplified by the optical amplifier 21. One of the two split parts of the OTDM signal and the control light are input into the optical pulse narrowing means 24. The optical pulse narrowing means 24 restores the control signal having wavelength $\lambda_1$ broadened in a time range to the original pulse line. This optical pulse narrowing means 24 works as an optical pulse broadening means for the OTDM signal, and the waveform of the OTDM signal having a wavelength $\lambda_0$ is broadened in a time range and output, and thus it is possible to regenerate only the control light. In addition, the other of the two split parts of the OTDM signal and the control light are input into the optical time division demultiplexing means 23, but because the control light intensity is low compared to the OTDM signal intensity, it is possible to regenerate only the OTDM signal.

The control light having a wavelength $\lambda_1$ restored by the optical pulse narrowing means 24 is converted into an electric signal by the optoelectric conversion means 25, and the information related to the optical time division multiplexing transmitted by the control light (frame head position, the bit rate of each channel, the arrangement of the channels, etc.) and the transmission quality monitoring information, etc., are read by the control signal processing means 26. In addition, when the control light is set so as to have a timing clock component on the transmitting side, this timing clock is extracted and sent to the optical time division demultiplexing means 23. Moreover, when the control light carries the frame information, the forward error correction code, etc., of the OTDM signal, it is necessary to design the optical receiver 2 so that the timing for transmitting the extracted information to the optical time division demultiplexing means 23 conforms to the frame phase of the OTDM signal.

The optical time division demultiplexing means 23 separates the OTDM into an N line channel according to the timing clock and the optical time division demultiplexing control signal from the control signal processing means 26. An optical separation circuit using a nonlinear optical loop mirror, for example, (see K. Uchiyama et al., "100 Gbit/s to 6.3 Gbit/s demultiplexing experiment using polarization-independent nonlinear optical loop mirror", Electron. Lett., Vol. 29, pp. 873–875, 1994), and an optical separation circuit using the four wave light mixing effect (see P. A. Andrekson et al., "16 Gbit/s all-optical demultiplexing using four wave mixing", Electron. Lett., Vol. 27, pp. 922–924, 1991) can be used as an optical time division demultiplexing means 23.

Thereby, using control light having a wavelength equal to or almost equal to that of the OTDM signal, it is possible to realize a time division multiplexing transmission system that can transmit control information for optical time division multiplexing, such as frame detection, channel regeneration, transmission quality monitoring, and a timing clock. In addition, the above explanation was given in terms of an application to the time division multiplexing format, but it can be applied in the same manner to RZ, NRZ, etc., time division multiplexing format at the electric stage.

The optical encoding method and the wavelength dispersion application method can be used as methods to broaden the optical pulse in the optical pulse broadening means 13. The reverse optical encoding method and reverse wavelength dispersion application method can be used as optical pulse narrowing methods in the optical pulse narrowing means 24.

In the optical encoding method, as shown in FIG. 2A, the optical frequency component of the optical pulse is divided into a plurality of parts by the optical wavelength division demultiplexer 31-1, a phase modulation of differing amounts is imparted to each of the frequency components by a degree of phase modulation based on the fixed coding sequence by the phase modulators 32-1~32-n, and by multiplexing each of the frequency components by the optical wavelength division multiplexer 34-1, the optical waveform is broadened on the time axis. In addition to this method, it is also possible to use the method of imparting an amount of intensity modulation differing for each of the frequency components by the intensity modulators 35-1~35-n, as shown in FIG. 3A, and the method of imparting differing amounts of phase modulation and intensity modulation to each of the frequency components by the phase and intensity modulators 37-1~37-n, as shown in FIG. 4A.

Figure 2B:
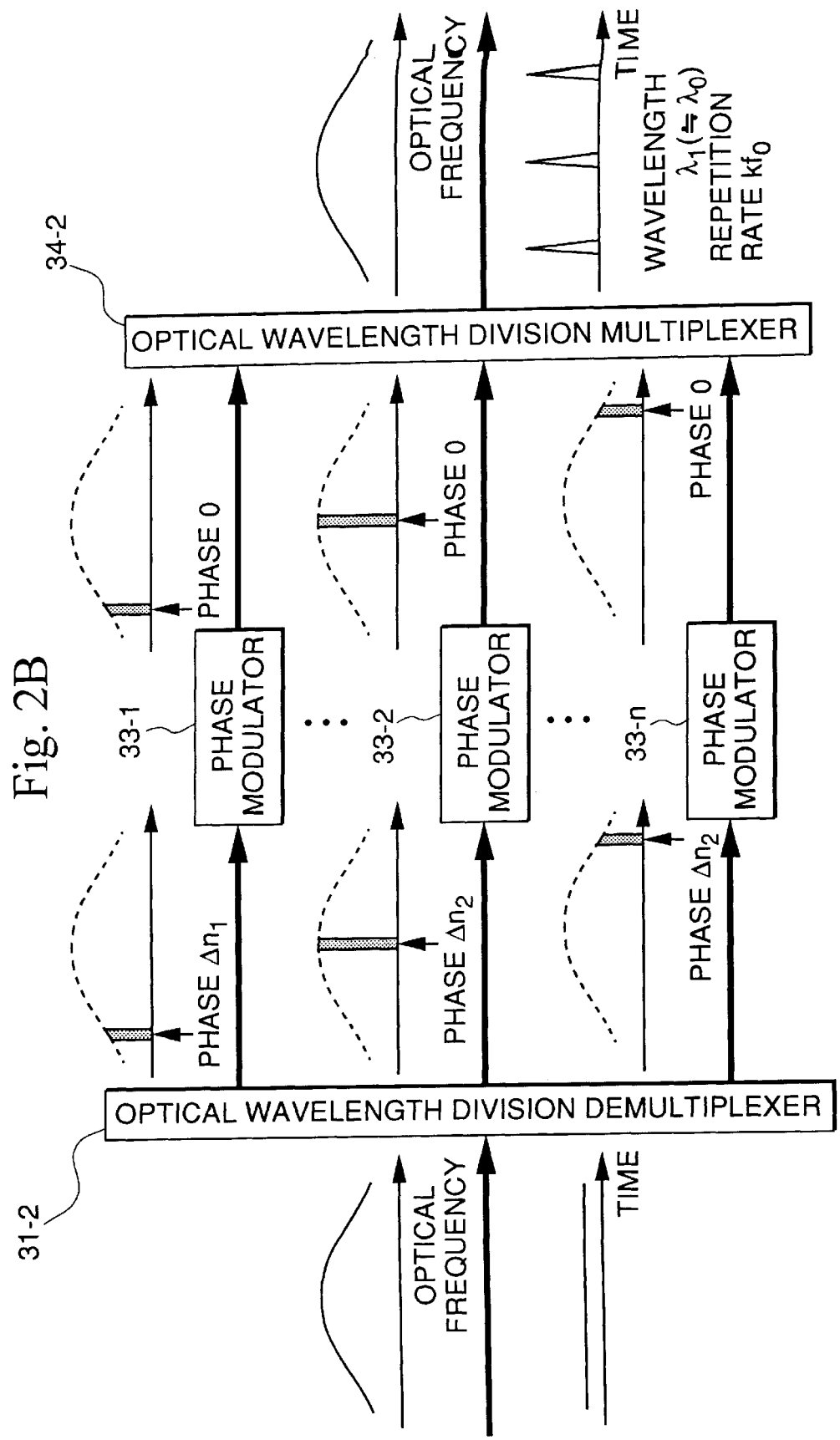
FIG. 2B is a drawing showing an example of a first structure of the optical pulse narrowing means 24 (encoding method).
Figure 3A:
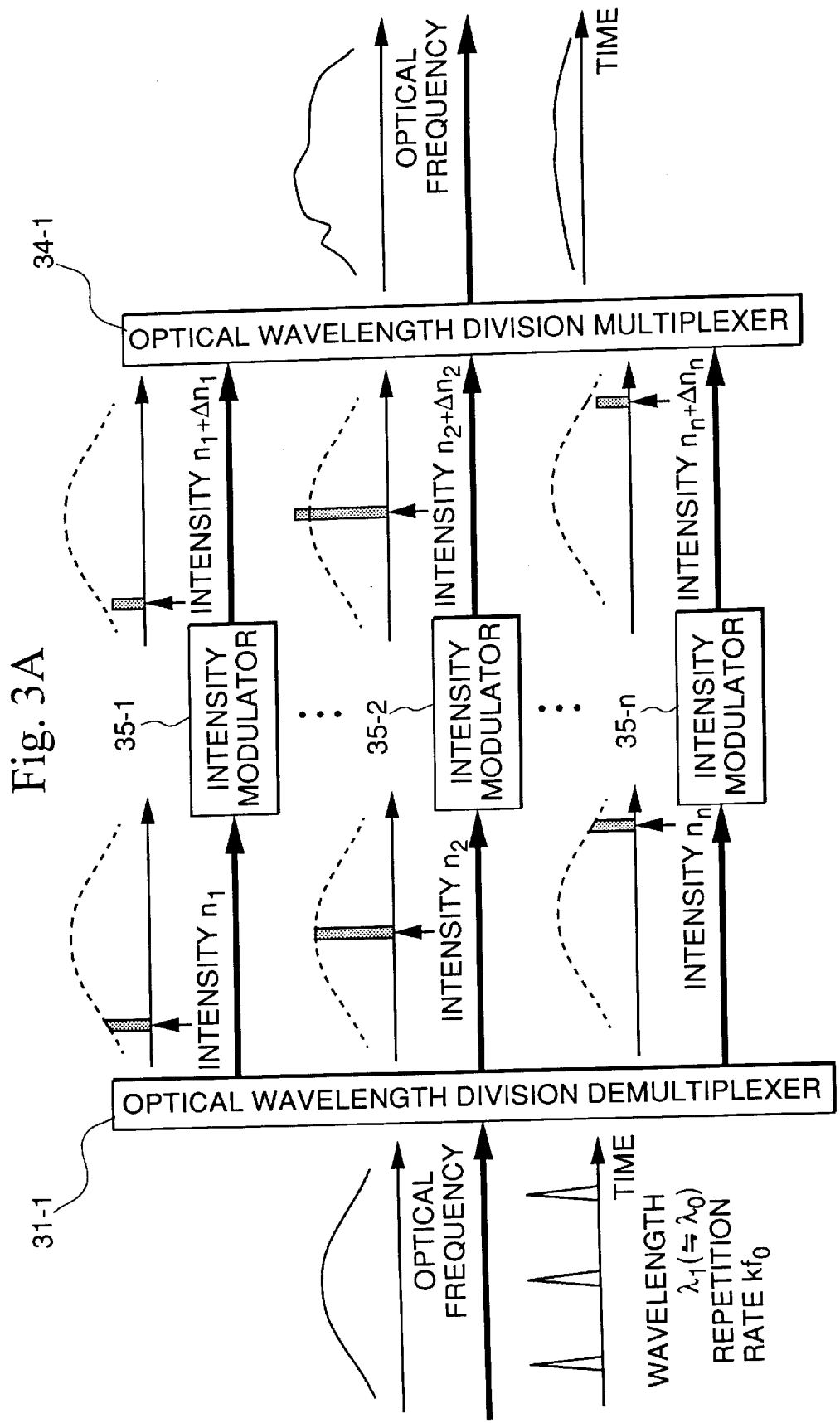
FIG. 3A is a drawing showing an example of a second structure of the optical pulse broadening means 13 (encoding method).
Figure 4B:
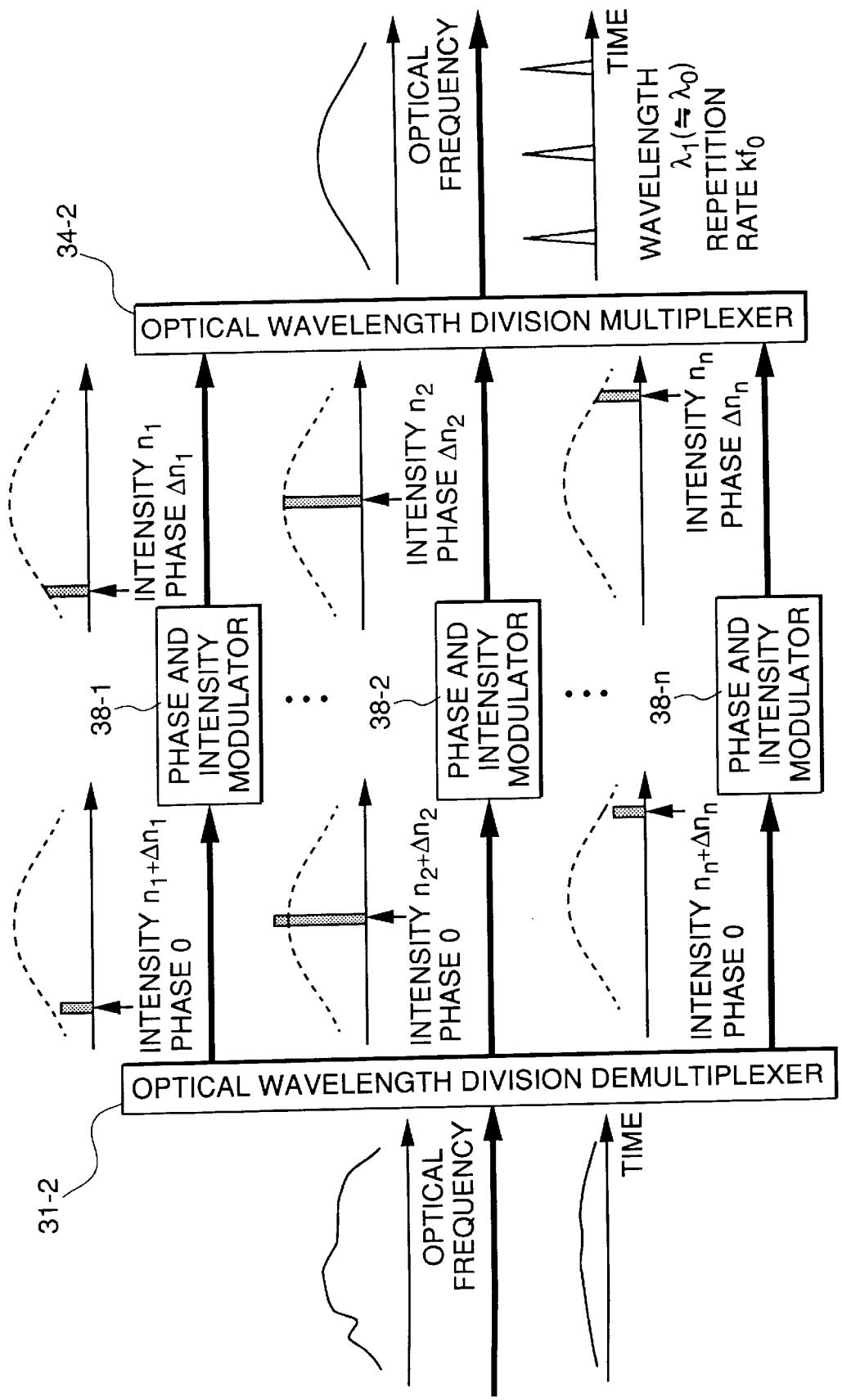
FIG. 4B is a drawing showing an example of a third structure of the optical pulse narrowing means 24 (encoding method).

In the reverse encoding method, as shown in FIG. 2B, the frequency component of the optical pulse is divided into a plurality of parts by the optical wavelength division demultiplexer 31-2, phase modulation of differing amounts is imparted to each of the frequency components by the degree of phase modulation based on the fixed coding sequence, which are the phase modulators 33-1~33-n, and by multiplexing each of the frequency components by the amount of phase modulation set based on the encoding sequence that is the reverse of the optical pulse broadening means by the phase modulators 33-1~33-n, the optical waveform is restored to its original form on the time axis. In addition to this method, it is also possible to use the method of imparting an amount of intensity modulation differing for each of the frequency components by intensity modulators 36-1~36-n, as shown in FIG. 3A, and the method of imparting differing amounts of phase modulation and intensity modulation to each of the frequency components by the phase and intensity modulators 38-1~38-n, as shown in FIG. 4A.

In the optical pulse broadening means 13, the optical encoding method and the optical pulse narrowing method by the optical reverse encoding method shown in FIG. 2A, FIG. 2B, FIG. 3A, FIG. 3B, FIG. 4A, and FIG. 4B, make it possible to use a spatial phase modulator (see J. A. Salehi, "Coherent Ultrashort Light Pulse Code-Division Multiple Access Communication Systems", J. Lightwave Technol., Vol. 8, No. 3, pp. 478–491, 1990) and a PLC phase modulation circuit (see Takiguchi et al., "The principles and experiments of coherent optical CDMA using an array waveguide lattice pair", Electronics Information Communication Association, Spring 1998, C-3-115 [in Japanese]).

The wavelength dispersion application method, as shown in FIG. 5A, reduces the optical peak intensity by broadening the pulse width according to the amount of its wavelength dispersion by the wavelength dispersion application means 39 applying a specified wavelength dispersion amount (D(ps/nm)) to the optical pulse. Moreover, the wavelength dispersion application means 39 must have a sufficiently large amount of wavelength dispersion so that the control light peak intensity during broadening becomes smaller than the OTDM signal peak intensity by one or more digit. Furthermore, by the optical pulse width during broadening becoming smaller than the repeating period of the input optical pulse train, the interference between adjacent pulses becomes small, and it is possible to generate a stable control light, having small intensity fluctuations.

The reverse wavelength dispersion application method, as shown in FIG. 5B, restores the optical pulse train by the wavelength dispersion application means 40 applying a specified wavelength dispersion amount (−D(ps/nm)) of the coding that is the reverse of that of the wavelength dispersion application means 39. In the wavelength dispersion application means 39 and 40, it is possible to use an optical fiber, a chirped optical fiber grating (see K. O. Hill, "Aperiodic Distributed-Parameter Waveguide for Integrated Optics", Appl. Opt., Vol. 13, No. 8, pp. 1853–1856, 1974), etc.

Figure 6:
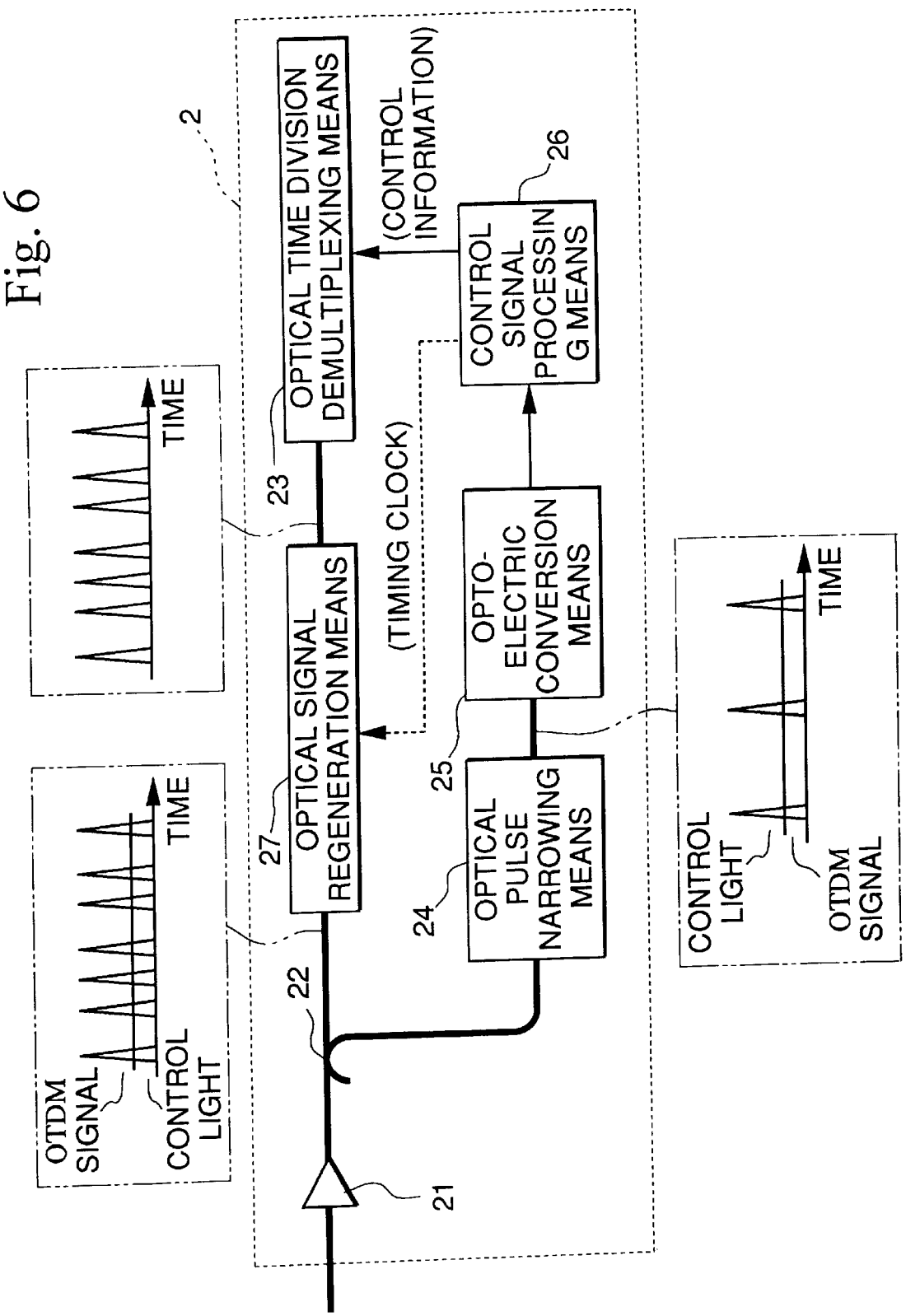
FIG. 6 is a block diagram showing a second embodiment of the optical transmission system of the present invention.

FIG. 6 shows a second embodiment of the optical transmission system of the present invention.

This embodiment is characterized in an optical signal regeneration means 27 that regenerates in the optical domain the light of the superimposed OTDM signal and control light being disposing before the optical time division demultiplexing means 23 of the optical receiver 2, eliminating the low-level control light component, and inputting only the high-level OTDM signal component to the optical time division demultiplexing means 23. Thereby, the S/N ratio is improved, and it is possible to realize an optical transmission system with good transmission characteristics.

As the optical signal regeneration means 27, it is possible to use saturable absorbing body (see Hirano, et al, "Optical processing technology using high speed saturable absorbing body type optical gate and its application to optical identification and optical time division separation circuits", Electrical Information Communication Association Research Report OCS 96-29 [in Japanese]), a nonlinear amplifying loop mirror (NALM) (see M. E. Fermann et al., "Nonlinear amplifying loop mirror", Opt. Lett., Vol. 15, No. 13, pp. 752–754, 1990), and 2R or 3R optical signal processing using a light transverse injection-type bistable laser (see Nonaka et al., "Optical signal processing using a laser-type optical switch", Electrical Information Communication Association Research Report OCS 97-109 [in Japanese]).

Figure 7:
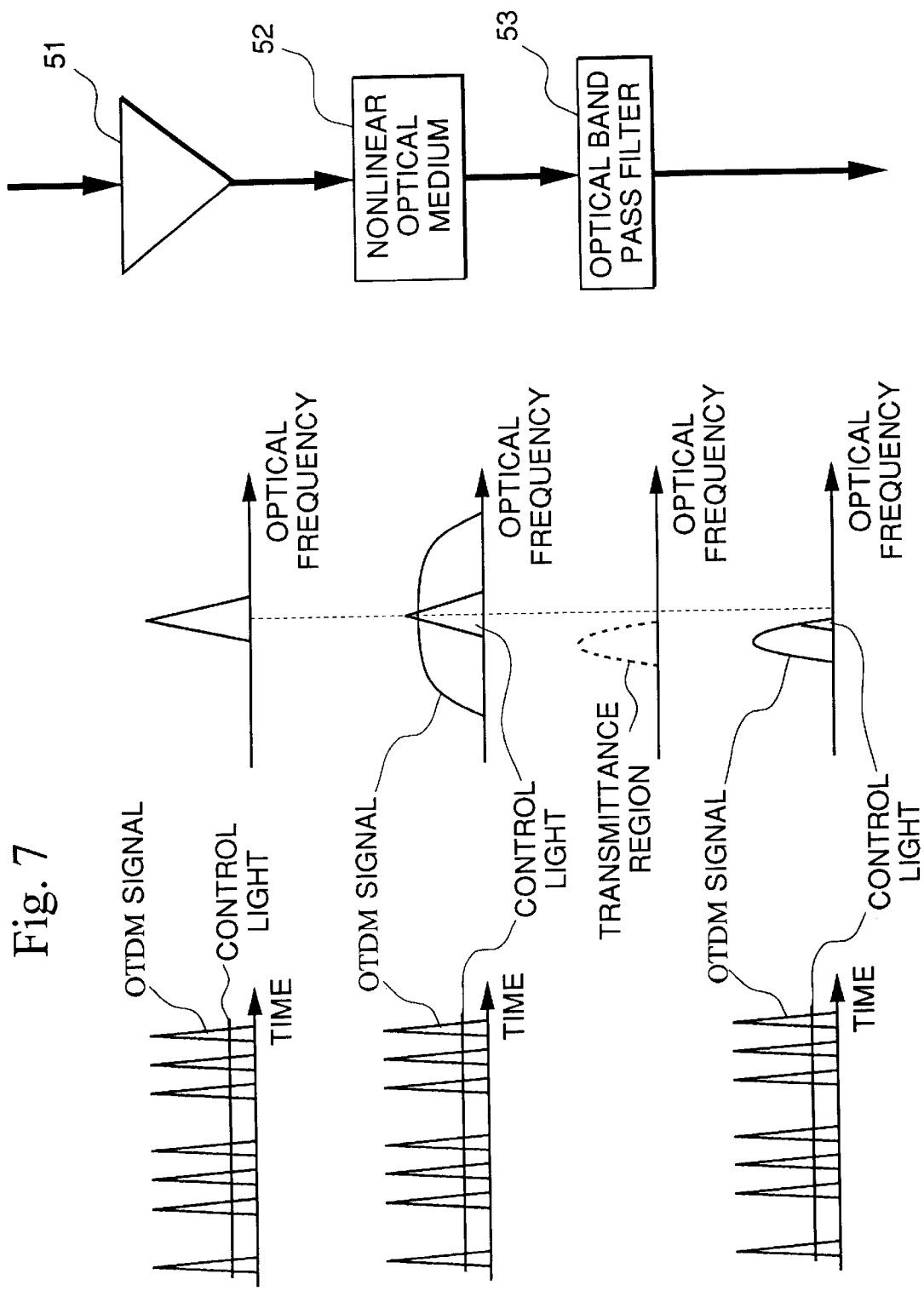
FIG. 7 is a drawing showing an example of a structure of the optical signal regeneration means 27.

In addition, it is possible to use a method that employs the difference in nonlinear optical effects due to differences in the peak power of the OTDM signal and the control light. For example, as in the structure shown in FIG. 7, when the light made up of the overlapping of the OTDM signal and the control light is amplified by the optical amplifier 51 and input into the nonlinear optical medium 52, the spectral spread of the OTDM signal having the peak power becomes great due to self-phase modulation or mutual-phase modulation (see P. V. Mamyshev, "All-Optical Regeneration Based on Self-phase Modulation Effect", ECOC'98, Vol. 1, pp. 475–476, 1998). Thus, by cutting off one part of the broadened spectrum by an optical band pass filter 53, it is possible to obtain an OTDM signal having the influence of the control light reduced.

In addition, when frame information and a timing clock are necessary for the optical signal regeneration means 27, the frame information and the timing clock detected by the control signal processing means 26 are input. As this kind of optical signal regeneration means 27, a phase sensitive optical amplifier (PSA) (see Japanese Unexamined Patent, First Publication, NO. Hei 9-222622, "An Optical Amplifier and an Optical Amplifier Transmission System"), or a nonlinear optical loop mirror (NOLM) (see J. J. Doran, "Nonlinear-optical loop mirror", Opt. Lett., Vol. 13, No. 1, pp. 56–58, 1988) can be used.

Figure 8:
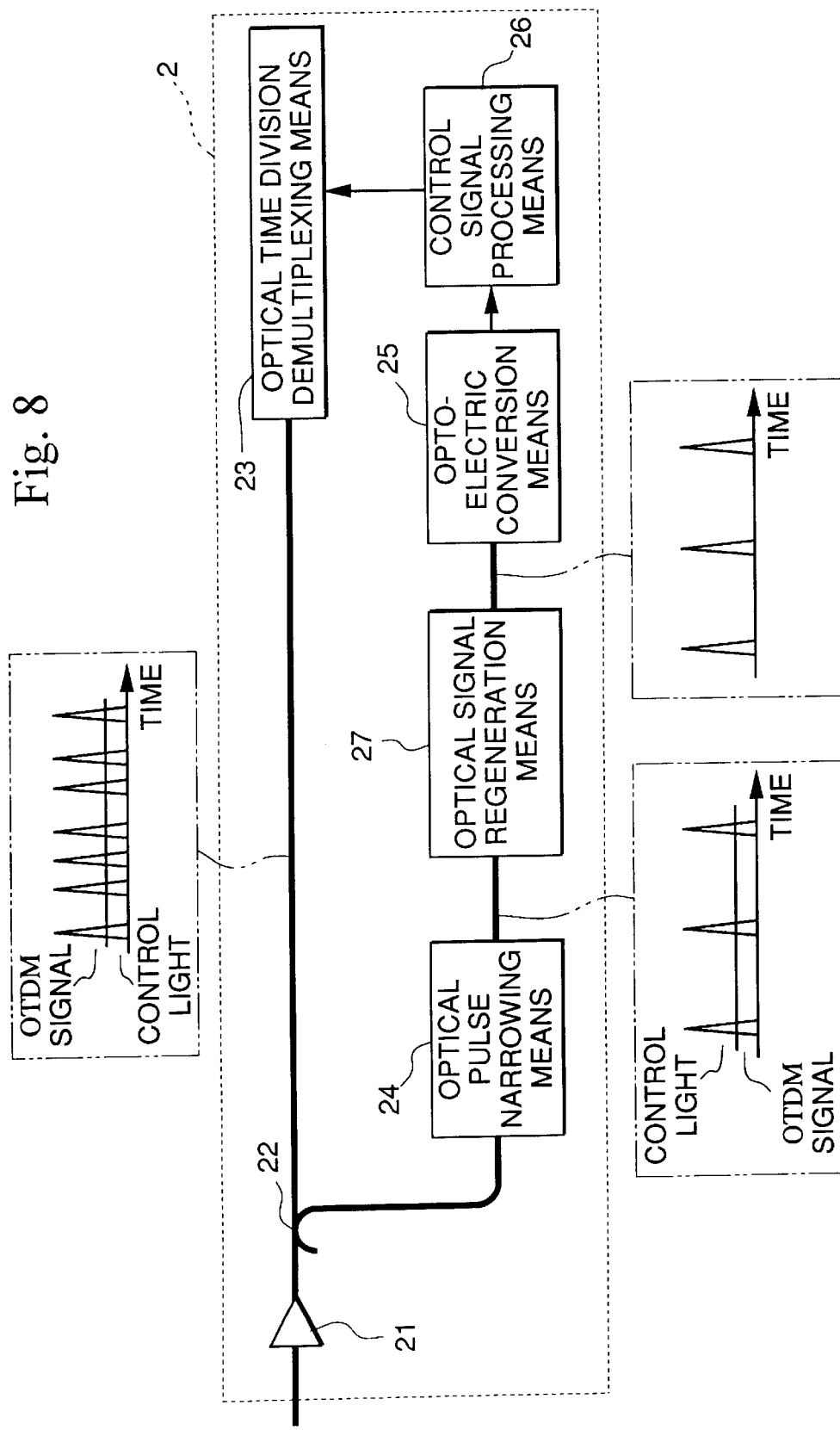
FIG. 8 is a block diagram showing a third embodiment of the optical transmission system of the present invention.

FIG. 8 shows a third embodiment of the optical transmission system of the present invention.

This embodiment is characterized in an optical signal regeneration means 27 that regenerates in the optical domain the light of the superimposed OTDM signal and control light being disposing before the optoelectric conversation means 25 of the optical receiver 2, eliminating the OTDM signal component whose peak intensity has become lowered due to the optical pulse narrowing means 24, and inputting only the control light component having a high level into the control signal processing means 26. Thereby, the identification of the control light is easy.

As the optical signal regeneration means, as shown in the second embodiment, it is possible use saturable absorbing body using the semiconductor, a nonlinear amplifying loop mirror (NALM), 2R and 3R optical signal processing using a light transverse injection-type bistable laser, a method using the difference in nonlinear optical effects due to the difference in peak power between the OTDM signal and the control light (here, the control light having a high peak power causes spectral broadening, and the control signal light for which the influence of the OTDM signal is decreased is obtained). Moreover, it is possible to dispose the optical signal regeneration means 27 before both the optical time division demultiplexing means 23 of the optical receiver and the optoelectric convention means 25.

Figure 9:
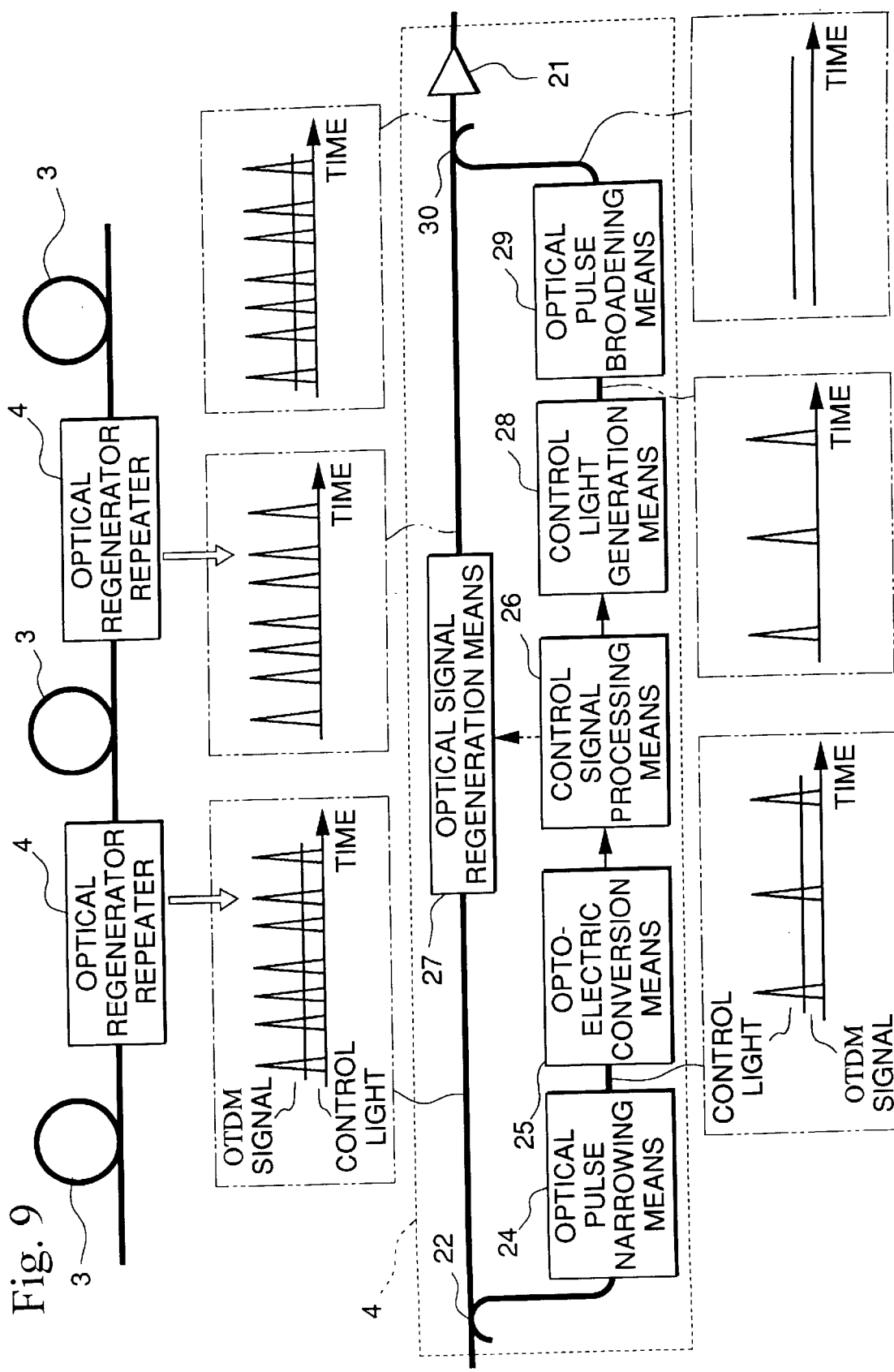
FIG. 9 is a block diagram showing a fourth embodiment of the optical transmission system of the present invention.

FIG. 9 shows a fourth embodiment of the optical transmission system of the present invention.

The present embodiment is characterized in carrying out regeneration of the OTDM signal and the control light by optical signal regenerators 4 that are inserted at appropriate intervals on the optical transmission fiber 3 connecting the optical transmitter 1 and the optical receiver 2.

The OTDM signal and the signal light input into the optical regenerator 4 are split into two parts by the optical splitting means 22, and one part of the OTDM signal and the signal light is input into the optical pulse narrowing means 24. The optical pulse narrowing means 24 restores the control light broadened in a time range to the original optical pulse train, and broadens the OTDM signal in a time range. It is possible to use the structures shown in FIGS. 2A–5, corresponding to the optical pulse broadening means 13 of the optical transmitter 1 as the optical pulse narrowing means 24. The restored control light is converted to an electrical signal by the optoelectric conversion means 25, and the information related to the optical time division multiplexing (frame head position, the bit rate of each channel, the arrangement of channels, etc.), transmission quality monitoring information, timing clock, etc., are read by the control signal processing means 26.

The optical signal regeneration means 27 inputs and regenerates in a time range the other part of the OTDM signal and control light split by the optical splitting means 22, and because the control light intensity is low in comparison to the OTDM signal intensity, it is possible to improve the S/N ratio by identifying only the OTDM signal. In addition, when frame information and a timing clock are necessary at the optical signal regenerating means 27, frame information and the timing clock detected by the control signal processing means 26 are input.

Moreover, in the former optical signal regeneration means 27, low intensity light is eliminated without using a timing clock, and as is shown in the second example, it is possible use a saturable absorbing body using a semiconductor, a nonlinear amplifying loop mirror (NALM), 2R and 3R optical signal processing using a light transverse injection-type bistable laser, and a method using the difference in nonlinear optical effects due to the difference in peak power between the OTDM signal and the control light. This optical signal regenerator 4 can also use an optical 2R relay (equalization and regeneration).

In addition, the later optical signal regeneration means 27 carries out regeneration of incident light by an external optical clock, and as shown in the second embodiment, can use a phase sensitive optical amplifier (PSA) and a nonlinear optical loop mirror (NOLM). In this optical signal regenerator 4, using the timing clock from the control signal processing means 26, it is possible to carry out optical 3R relay (equalization, retiming, regeneration).

In this manner, in the regenerated OTDM signal, since the control light is not included, it is necessary to regenerate the control light, multiplex it with the OTDM signal, and deliver it to the optical transmission fiber. Based on the timing clock extracted by the control signal processing means 26, the control signal generation means 28 generates an optical pulse train having wavelength $\lambda_1(\neq\lambda_0)$, which is then intensity modulated or phase modulated using the information related to optical time division multiplexing and transmission quality information detected by the control signal processing means 26, and output.

Moreover, the second optical signal regeneration means that regenerates the control light in the second aspect of the invention corresponds here to the optoelectric conversion unit 25, the control signal processing means 26, and the control signal optical generating means 28.

The optical pulse waveform of the regenerated control light output from the control signal generating means 28 is broadened in a time range by the optical pulse broadening means 29, and converted into control light having a sufficiently low peak intensity compared to the peak intensity of the OTDM signal. Thereby, the regenerated OTDM signal and control light are multiplexed by optical multiplexing means 30, and output to the optical transmission fiber 3 after being optically amplified by the optical amplifier 21. At this time, the specific relation between the frame head position of the OTDM signal and the frame head position of the control light is set. In addition, the polarization relationship between the OTDM signal and the control light can be set so as to be in a mutually orthogonal state when incident on the optical coupling means 30. In addition, the optical amplifier 21 can be disposed before or after or on both sides of the optical splitting means 22.

Figure 10:
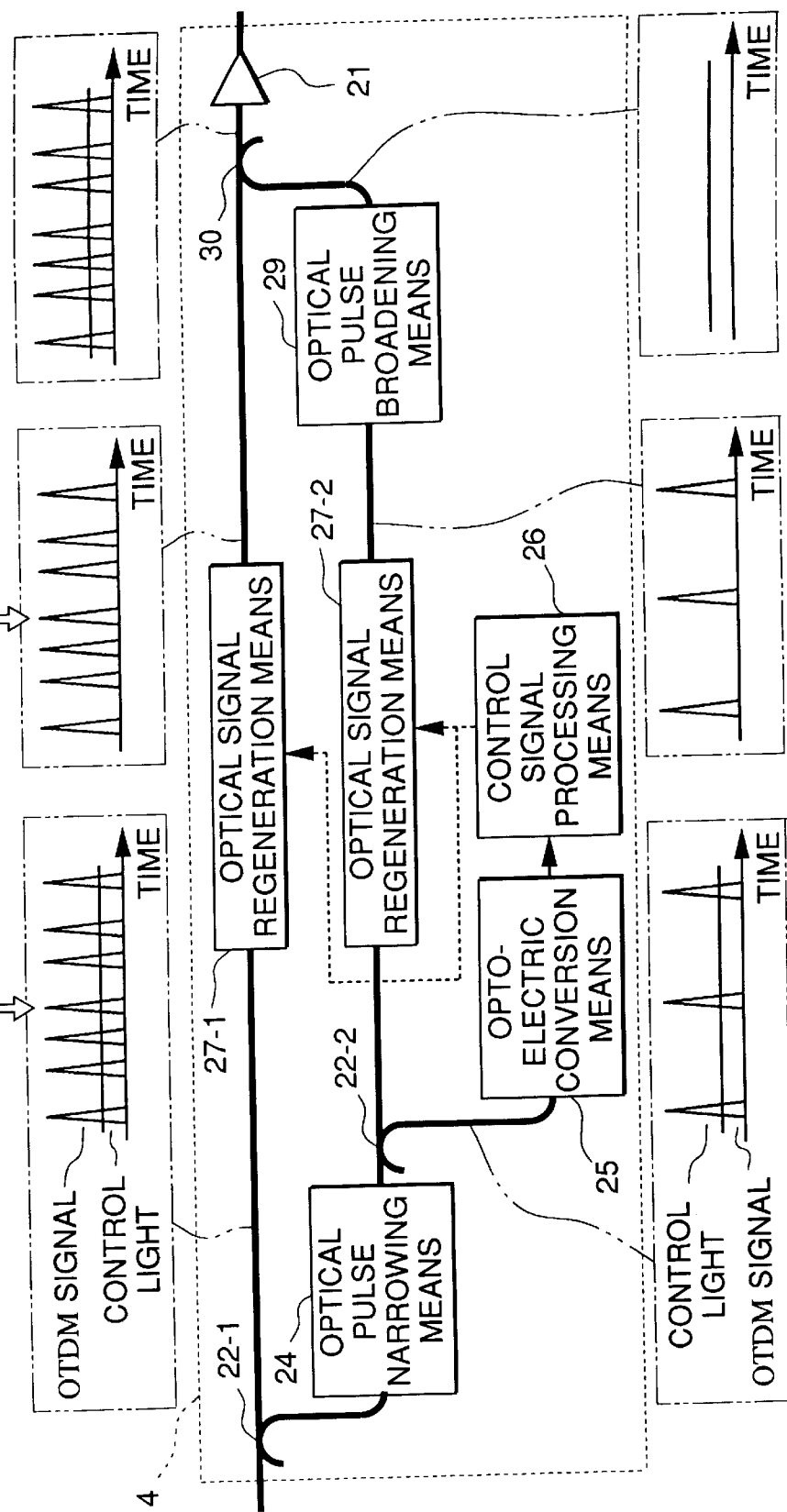
FIG. 10 is a block diagram showing a fifth embodiment of the optical transmission system of the present invention.

FIG. 10 shows a fifth embodiment of the optical transmission system of the present invention.

This embodiment is characterized in that, like the fourth embodiment, regeneration of the OTDM signal and the control light is carried out by the optical signal regenerator 4, but the regeneration method of the control light differs from that of the fourth embodiment.

The OTDM signal and the control light input to the optical regenerator 4 are split into two parts by the optical splitting means 22-1, and one part of the OTDM signal and the control light are input into the optical pulse narrowing means 24. The optical pulse narrowing means 24 restores the control light broadened in a time range to the original optical pulse train, and broadens the OTDM signal in the time range. The structure shown in FIGS. 2A~5 corresponding to the optical pulse broadening means 13 of the optical transmitter 1 can be used as the optical pulse narrowing means 24. This OTDM signal and the restored control light are split by the optical splitting means 25, and one part of the OTDM signal and the control light are converted into an electric signal by an optoelectric conversion means 25, and the timing clock, etc., are read by the control signal processing means 26.

The optical signal regeneration means 27-2 inputs the other part of the OTDM signal and the control light split by the optical splitter 22-2, and regenerates them in a optical domain, but because the OTDM signal intensity is low compared to the control light intensity, it is possible to identify only the control light. In addition, when a timing clock is necessary at the optical signal regeneration means 27-2, the timing clock detected by the control signal processing means 26 is input.

The optical signal regeneration means 27-1 inputs the other part of the OTDM signal and the control light split by the optical splitting means 22-1 and regenerates them in a time range, but because the control light intensity is low compared to the OTDM signal intensity, it is possible to improve the S/N ratio by identifying only the OTDM signal. In addition, when frame information and a timing clock are necessary for the optical signal regenerating means 26, the frame information and the timing clock detected by the control signal processing means 26 are input. For the above optical signal regeneration means 27-1 and 27-2, it is possible to use the same one as is used in the fourth embodiment.

Moreover, the second optical signal regeneration means that regenerates the control light in the second aspect corresponds here to the optical splitting means 22-2, the optoelectric conversion means 25, the control signal processing means 26, and the optical signal regeneration means 27-2.

The optical pulse waveform of the regenerated control light output from the control signal generating means 27-2 is broadened in a time range by the optical pulse broadening means 29, and converted into control light having a sufficiently low peak intensity compared to the peak intensity of the OTDM signal. Thereby, the regenerated OTDM signal and control light are multiplexed by the optical multiplexing means 30, and output to the optical transmission fiber 3 after being optical amplified by the optical amplifier 21. At this time, the specific relation between the frame head position of the OTDM signal and the frame head position of the control light is set. In addition, the polarization relationship between the OTDM signal and the control light can be set so as to be in a mutually orthogonal state when incident on the optical coupling means 30. In addition, the optical amplifier 21 can be disposed before or on both sides of the optical splitting means 22.

Figure 21:
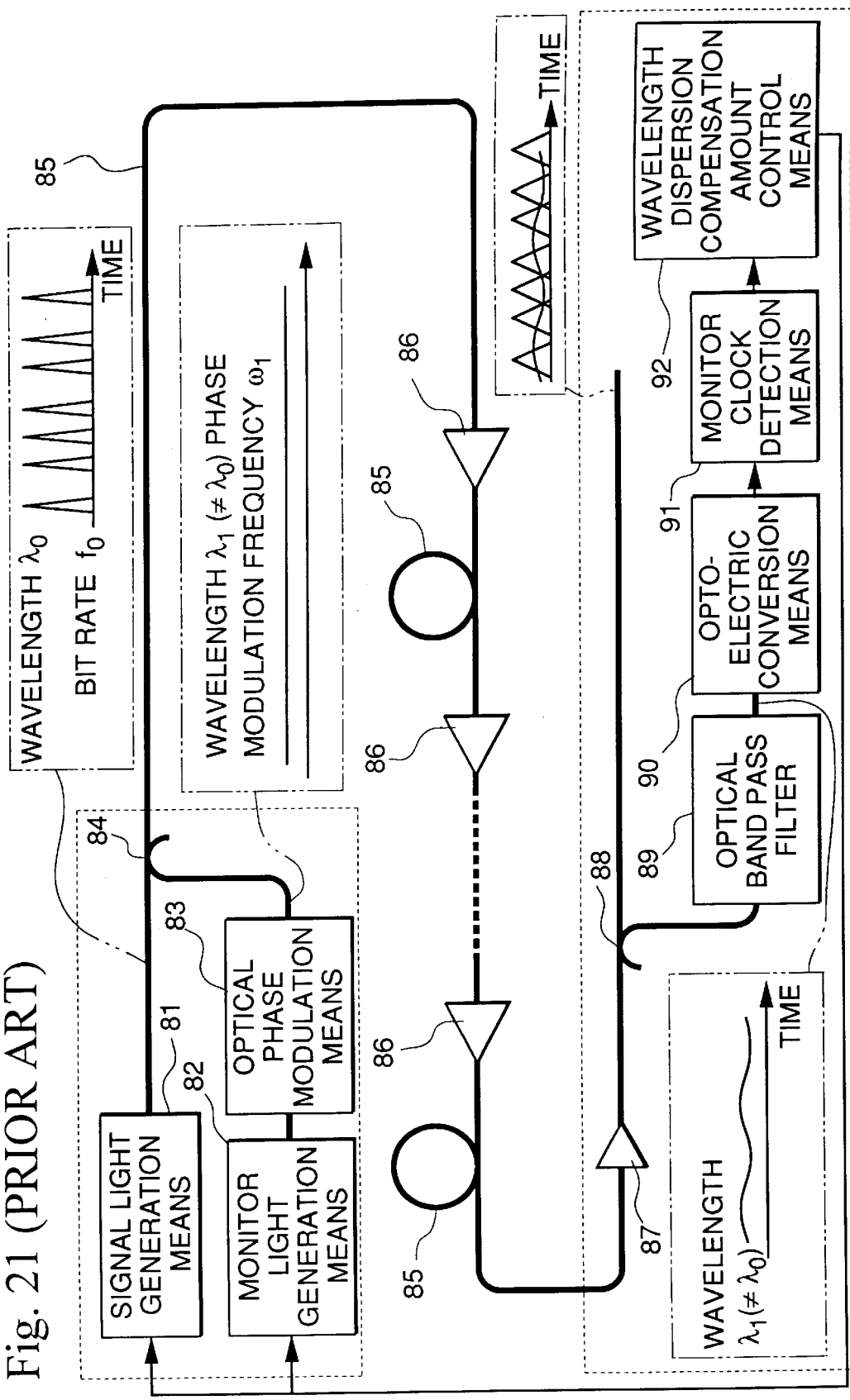
FIG. 21 is a block diagram showing a second example of a conventional structure that measures the wavelength dispersion of an optical transmission system.

In the structure of the embodiment shown above, the control light with the OTDM signal are multiplexed by the code division multiplexing format (CDM) or the dispersion division multiplexing (DDM) format and transmitted, the control light only is extracted by selecting the code or dispersion amount of the control signal on the receiving side, and the control signal that is included therein as digital data is read. If a correspondence is made between this relationship between the OTDM signal and the control light and the relationship between the signal light and monitor light in the structure that measures wavelength dispersion shown in FIG. 21, it is possible to multiplex and transmit the signal light and monitor light at the same or nearly the same wavelength. Below, an embodiment is explained for this case. Moreover, it is possible to use as monitor light of each embodiment shown below the control light in each of the above-described embodiments.

FIG. 11 shows a sixth embodiment of the optical transmission system of the present invention.

In the figure, the optical transmitter 1 and the optical receiver 2 are connected via the optical transmission fibers 3 and the optical linear repeaters 5. The optical transmitter 1 is structured using a signal light generation means 15, a monitor light generation means 16, an optical pulse broadening means 13, and an optical coupling means 14. The optical receiver 2 is structured by the wavelength dispersion adjustment means 41, the optical splitting means 22, the signal light processing means 42, the optical pulse narrowing means 24, the optoelectric conversion means 25, the monitor clock detection means 43, and the wavelength dispersion compensation amount control means 44.

The signal light generation means 15 outputs a signal light having wavelength $\lambda_0$ and bit rate $f_0$. The monitor light generation means 16 outputs an optical pulse train having a wavelength $\lambda_1(\approx\lambda_0)$ and a repeating frequency $f_1(<f_0)$. The optical pulse broadening means 13 broadens the waveform of the optical pulse train in a time range, and outputs monitor light having a sufficiently low peak intensity compared to the signal light peak intensity. The signal light and the monitor light are multiplexed by the optical coupling means 14, and transmitted by an optical transmission fiber 3 and an optical linear repeater 3. At this time, it is possible to use the minimum region of the optical band pass filter in the optical linear repeater 5 because the wavelength of the signal light and monitor light are nearly the same. Thereby, compared to the conventional method which uses monitor light having a wavelength that differs from that of the signal light, it is possible to cut out the ASE produced by the optical amplifiers and improve the transmission characteristics.

Moreover, the signal light generating means 15 does not depend on RZ or NRZ modulation if the time division multiplexing format is used. In addition, it is possible to use the optical time division multiplexing format. The monitor light generation means 16 can use a pulse light source that is different from that of the signal light generation means 15, and when using the pulse light source as the signal light generation means 15, it is possible to use an optical pulse train having a repeating frequency $f_0$ or an optical pulse train of $f_0/n$, which is 1/n of the cycle thereof.

In addition, the polarization relationship between the signal light and the monitor light can be arbitrary while incident on the optical coupling means 14, but in particular if both are set so as to be in a mutually orthogonal state, the interference between the signal light and the monitor light can be minimized.

The transmitted signal light and monitor light are wavelength dispersion compensated by the wavelength dispersion adjustment means 41 after being optically amplified by the optical amplifier 21, and split into two parts by the optical splitting means 22. One part of the split signal light and monitor light is input into the optical pulse narrowing means 24. The optical pulse narrowing means 24 restores the monitor light having a wavelength $\lambda_1$ broadened in the time range to the original optical pulse train. Because the optical pulse narrowing means 24 functions as an optical pulse broadening means for the signal light, and the waveform of the signal light having wavelength $\lambda_0$ is broadened and output, it is possible to identify only the monitor light. In addition, the other part of the split signal light and monitor light is input into the signal light processing means 42, but because the monitor light intensity is low in comparison to the signal light intensity, it is possible to identify only the signal light.

The monitor light having wavelength $\lambda_1$ restored by the optical pulse narrowing means 24 is converted into an electric signal by the optoelectric conversion means 25, and the clock component of the monitor light is detected by the monitor clock detection means 43. The wavelength dispersion compensation amount control means 44 controls the amount of wavelength dispersion of the wavelength dispersion adjustment means 41 so that the detected clock component is maximized.

Moreover, in the optical pulse broadening means 13 and the optical pulse narrowing means 25, the structures shown in FIGS. 2A–5 can be used for the control light of the above-described embodiment.

Figure 12A:
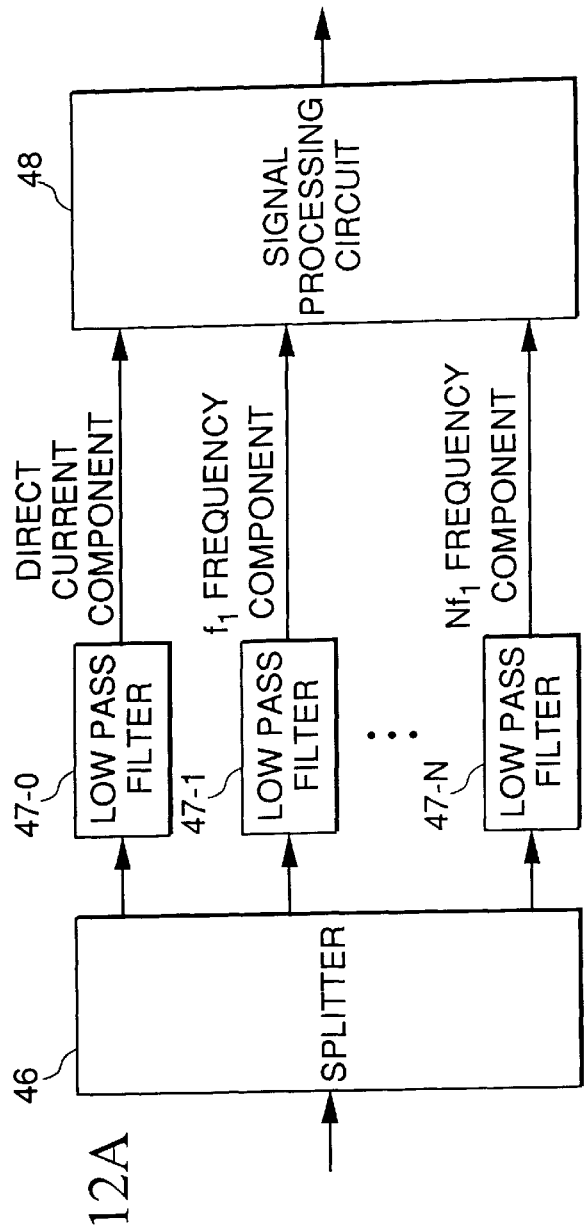
FIG. 12A is a drawing showing an example of the structure of the monitor clock detection means 43.

FIG. 12A shows an example of the structure of the monitor clock detection means 43. In this figure, the monitor clock detection means 43 is structured from a splitting means 46 that splits the electric signal, a low pass filter 47-0 that extracts the direct current component, a low pass filter 47-1 that extracts the monitor light pulse repeating frequency component ($f_1$), a low pass filter 47-N that extracts the higher harmonic component ($Nf_1$, N is an integer equal to or greater than 2), and a signal processing circuit 48.

Figure 12C:
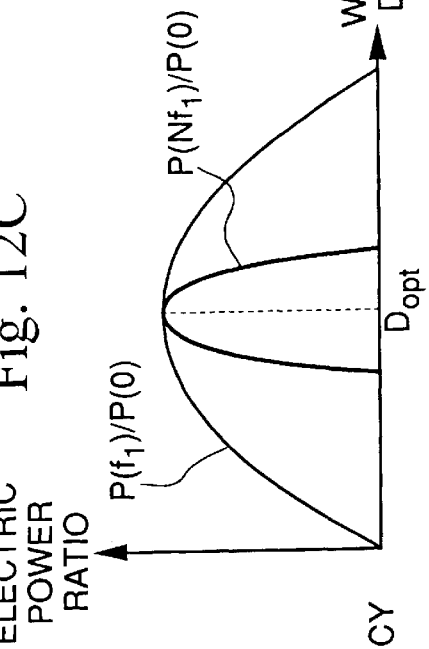
FIG. 12C is a drawing showing the wavelength dispersion characteristics of the monitor light.
Figure 12B:
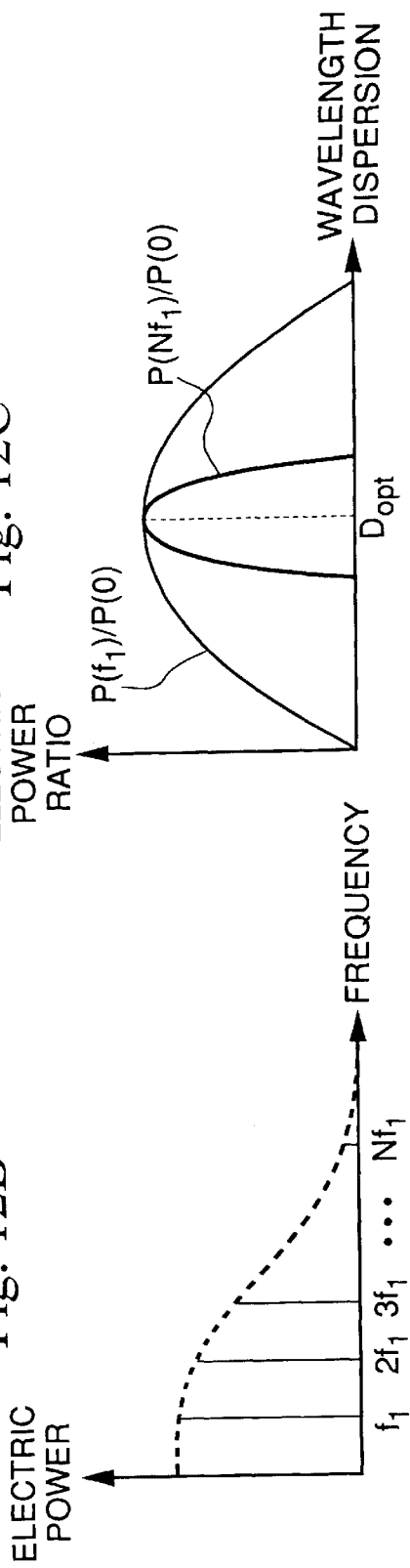
FIG. 12B is a drawing showing the electrical spectrum of the electric signal output from the optoelectric conversion means 25.

Because the monitor light is an optical pulse train, the electric power spectrum of the electric signal output from the optoelectric conversion means 25 has the monitor light pulse repetition rate component ($f_1$) and the higher harmonic component ($Nf_1$) as shown in FIG. 12B. For example, in the case that the optical pulse train has a pulse width of 3 ps and a pulse repetition rate of 1 GHz, the electric power spectrum extends to about 100 GHz, which corresponds to the direct current component and a pulse width of 3 ps. Each of the low pass filters 47-0–47-N detect the direct current component and the repetition rate component (or its higher harmonic component) from this electric signal, and the signal processing circuit 48 outputs as the clock component the ratio $P(f_1)/P(0)$ (or $P(Nf_1)/P(0)$ of) the repetition rate component electric power $P(f_1)$ (or the higher harmonic component electric power $PNf_1$)) and the direct current electric power $P(0)$. The wavelength dispersion compensation amount control means 44 controls the wavelength dispersion adjustment means 41 so that the clock component output from the monitor clock detection means 43 is maximized.

Moreover, because the short optical pulse waveform of the monitor light changes greatly with the fluctuation of the wavelength dispersion of the optical transmission fiber, among the clock components detected by the monitor clock detection means 43, in particular, it fluctuates sensitively to the higher harmonic component, as shown in FIG. 12C, and $P(Nf_1)/P(0)$ falls more than $P(f_1)/P(0)$, and the electric power ratio falls much more quickly than the fluctuation of the wavelength dispersion. Therefore, for example, when implementing the system, the optical wavelength dispersion compensation amount is found using the $P(f_1)/P(0)$, having a wavelength dispersion with a large dynamic range. In addition, during system use, using $P(Nf_1)/P(0)$, precise wavelength dispersion adjustment equalization of the optical transmission fiber is carried out. In this manner, according to the present invention, it is always possible to carry out optimal wavelength dispersion compensation either during system implementation or during system use.

As a wavelength dispersion adjustment means 41, it is possible to use a method wherein the wavelength dispersion characteristics of a chirped optical fiber grating are changed by temperature or tension and stress (see M. Kato et al., "A Dispersion Tunable Fiber Bragg Grating Compensator Designed to Overcome Wavelength Drift", OECC '97, Technical Digest, 9D1-2, pp208–209, 1997), etc.

Moreover, as a structure for controlling the amount of wavelength dispersion of the wavelength dispersion adjustment means 41, in place of the monitor clock detection means 43 and the wavelength compensation amount control means 44, it is possible to use a method that measures the Q value of the monitor light. That is, the histogram of the light intensity is found by sampling the monitor light, the S/N ratio coefficient time averaged by this histogram is monitored as the Q value, and the amount of wavelength dispersion of the wavelength dispersion adjustment means 41 is controlled so that this Q value shows a optimum value (see Japanese Unexamined Patent Application, First Publication, No. 10-229659, "Optical Signal Quality Monitor").

Figure 13:
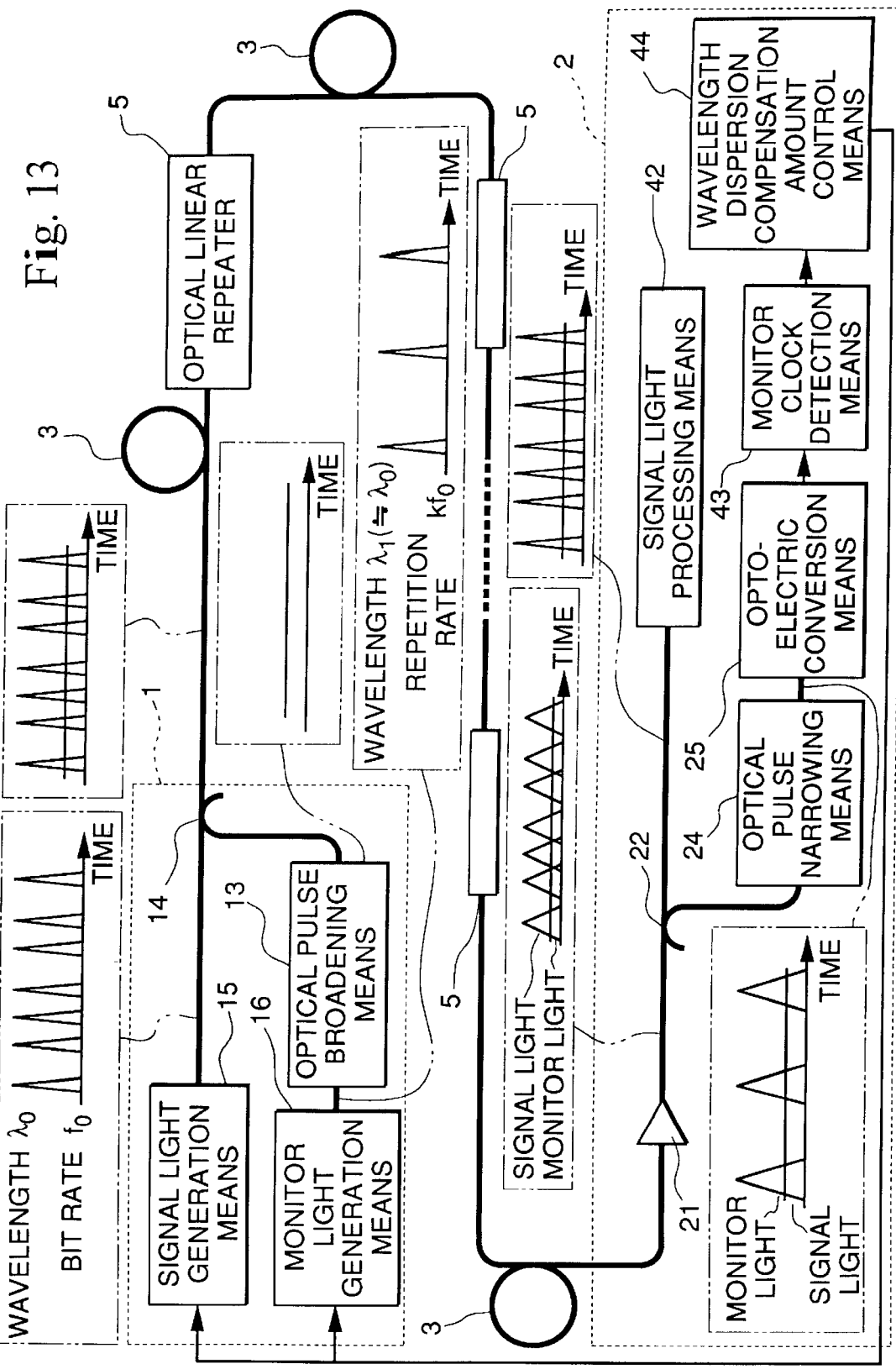
FIG. 13 is a block diagram showing a seventh embodiment of the optical transmission system of the present invention.

FIG. 13 shows a seventh embodiment of the optical transmission system of the present invention.

In contrast to the sixth embodiment, which carries out wavelength dispersion compensation using the wavelength dispersion adjustment means 41 of the optical receiver 2, a characteristic of the present embodiment is that the control signal output from the wavelength dispersion compensation amount control means 44 is fed back to the signal light generation means 51 of the optical transmitter 1 and the monitor light generation means 16, and by simultaneously changing the wavelength $\lambda_0$ of the signal light and the wavelength $\lambda_1$ of the monitor light, wavelength dispersion compensation is carried out.

The structure of broadening in a time range and transmitting the optical pulse waveform of the monitor light, restoring the original optical pulse at the receiving end, and controlling its clock component so as to be maximal, is the same as the sixth embodiment. Moreover, in this embodiment, because the wavelength $\lambda_0$ of the signal light and the wavelength $\lambda_1$ of the monitor light are set so as to be equal or nearly equal, by carrying out wavelength dispersion compensation on the monitor light, at the same time it is possible to carry out wavelength dispersion compensation on the signal light.

In addition, it is also possible to combine the sixth embodiment and the seventh embodiment, and carry out simultaneously wavelength dispersion compensation by the wavelength dispersion compensation means 41 of the optical receiver 2, and control of the wavelength $\lambda_0$ of the signal light and the wavelength $\lambda_1$ of the monitor light.

Figure 14:
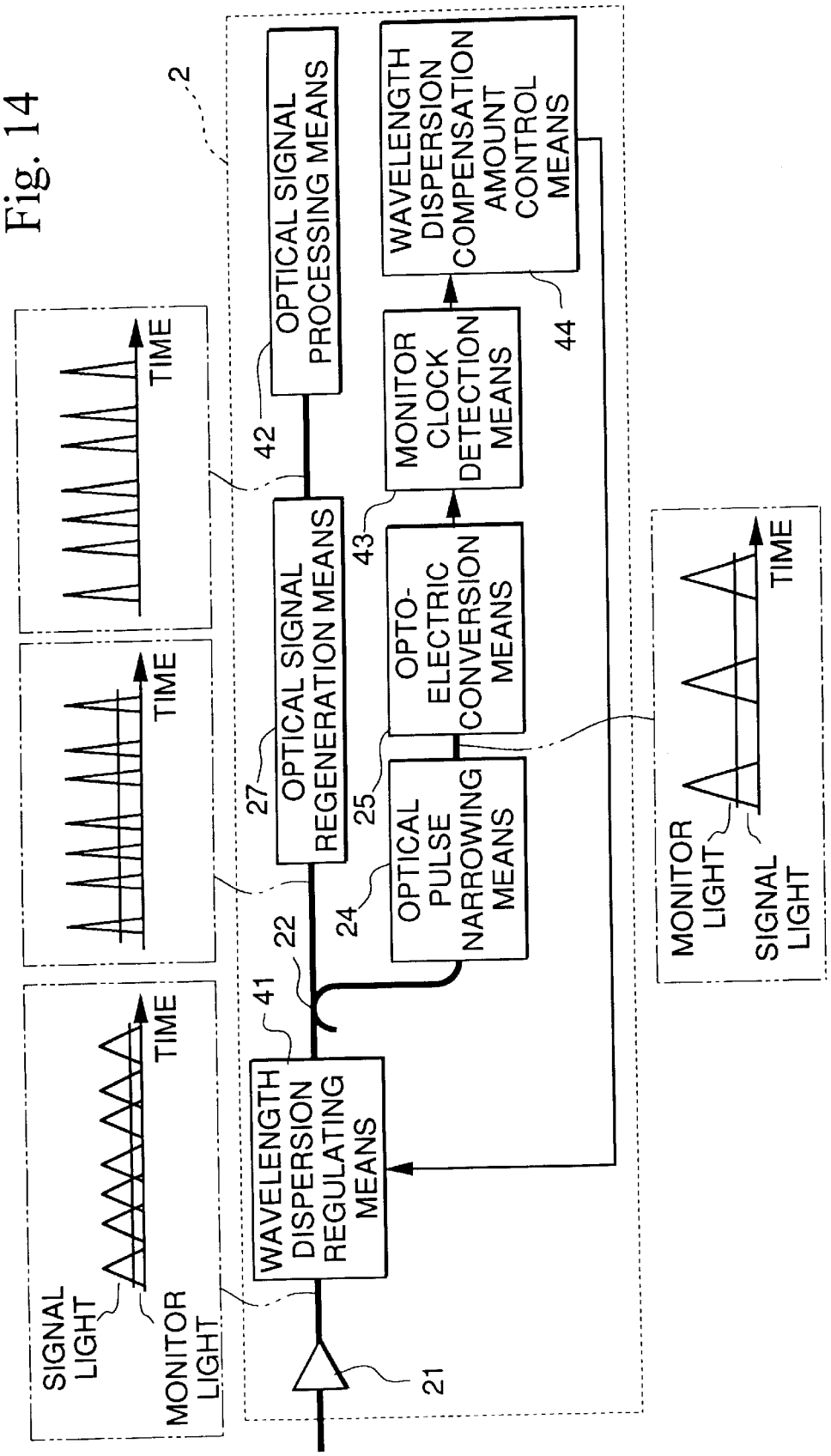
FIG. 14 is a block diagram showing a eighth embodiment of the optical transmission system of the present invention.

FIG. 14 shows an eight embodiment of the optical transmission system of the present invention.

The present embodiment is characterized by disposing an optical signal regenerating means 27 before the signal light processing means 42 of the optical receiver 2, eliminating the low level monitor light component, and inputting only the high level signal light component into the signal light processing means 42. Thereby, it is possible to realize an optical transmission system having good transmission characteristics. The present embodiment shows an example of the construction adapting the optical receiver 2 of the sixth embodiment, but it is possible to adapt in the same manner the optical receiver 2 of the seventh embodiment.

As the optical signal regeneration means 27, it is possible to use the above-described saturable absorption body, a nonlinear amplified loop mirror (NALM), 2R or 3R optical signal processing using a light transverse injection-type bistable laser, etc. In addition, by the structure shown in FIG. 7, it is possible to use a method employing the difference in nonlinear optical effects due to differences between the peak power of the signal light and the monitor light.

Figure 15:
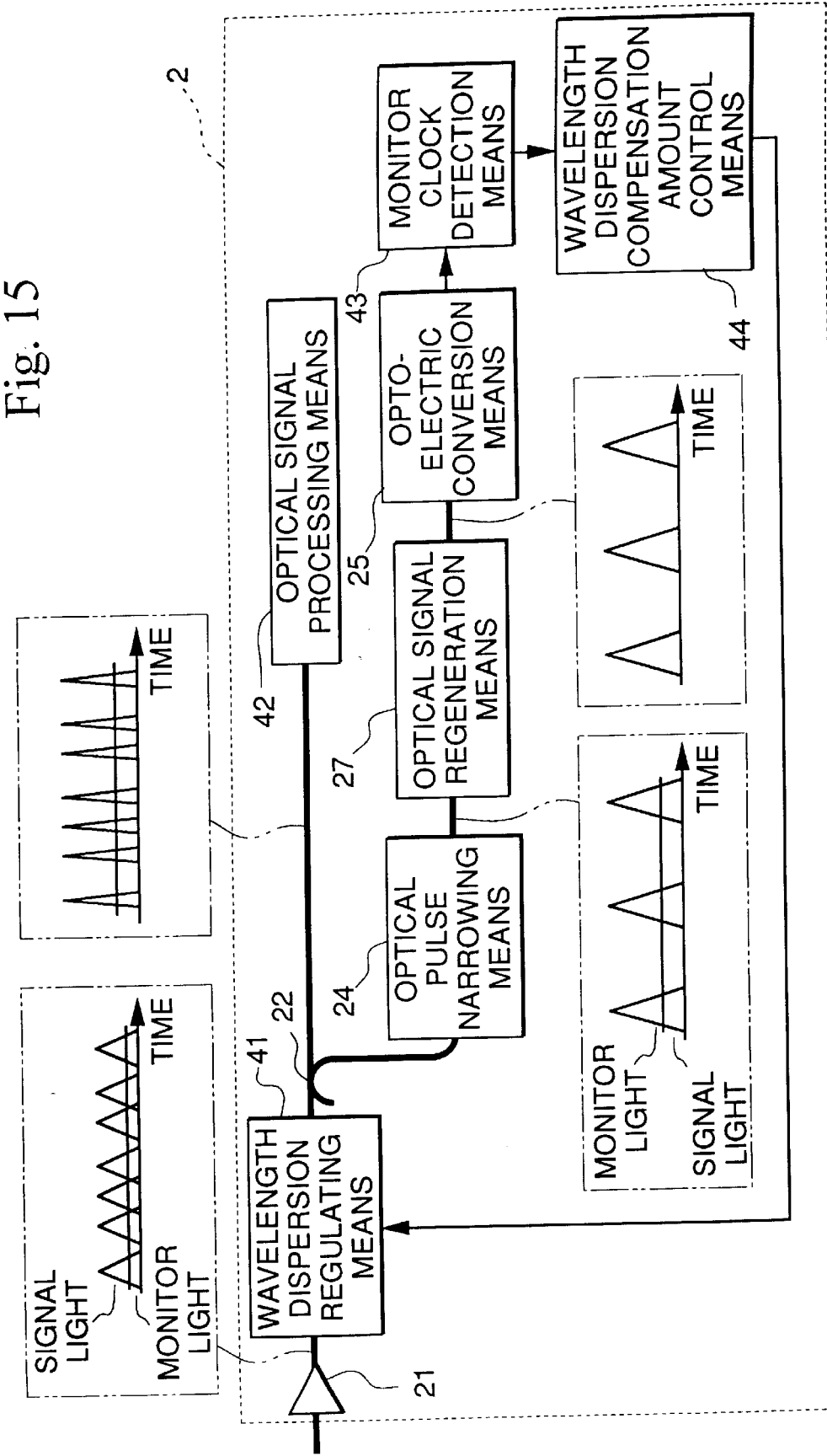
FIG. 15 is a block diagram showing a ninth embodiment of the optical transmission system of the present invention.

FIG. 15 shows a ninth embodiment of the optical transmission system of the present invention.

The present embodiment is characterized in disposing an optical signal regeneration means 27 before the optoelectric conversion means 25 of the optical receiver, eliminating the signal light component whose peak intensity has been decreased by the optical pulse narrowing means 24, and inputting only the high level monitor light component to the monitor clock detection means 43. Thereby, identifying the monitor light becomes easy. As the optical signal regeneration means 27, it is possible to use the above described saturable absorption body using a semiconductor, a nonlinear amplifier loop mirror, 2R or 3R optical signal processing using a light transverse injection-type bistable laser, or a method employing the difference in nonlinear optical effect due to the difference in peak power of the signal light and the monitor light.

The present embodiment shows an example of a structure adapting the optical receiver 2 of the sixth embodiment, but it can adapted in the same way to the optical receiver 2 of the seventh embodiment. In addition, it is possible to dispose an optical signal regeneration means 25 before both the signal light processing means 42 of the optical receiver 2 and the optoelectric conversion means 25.

Figure 16:
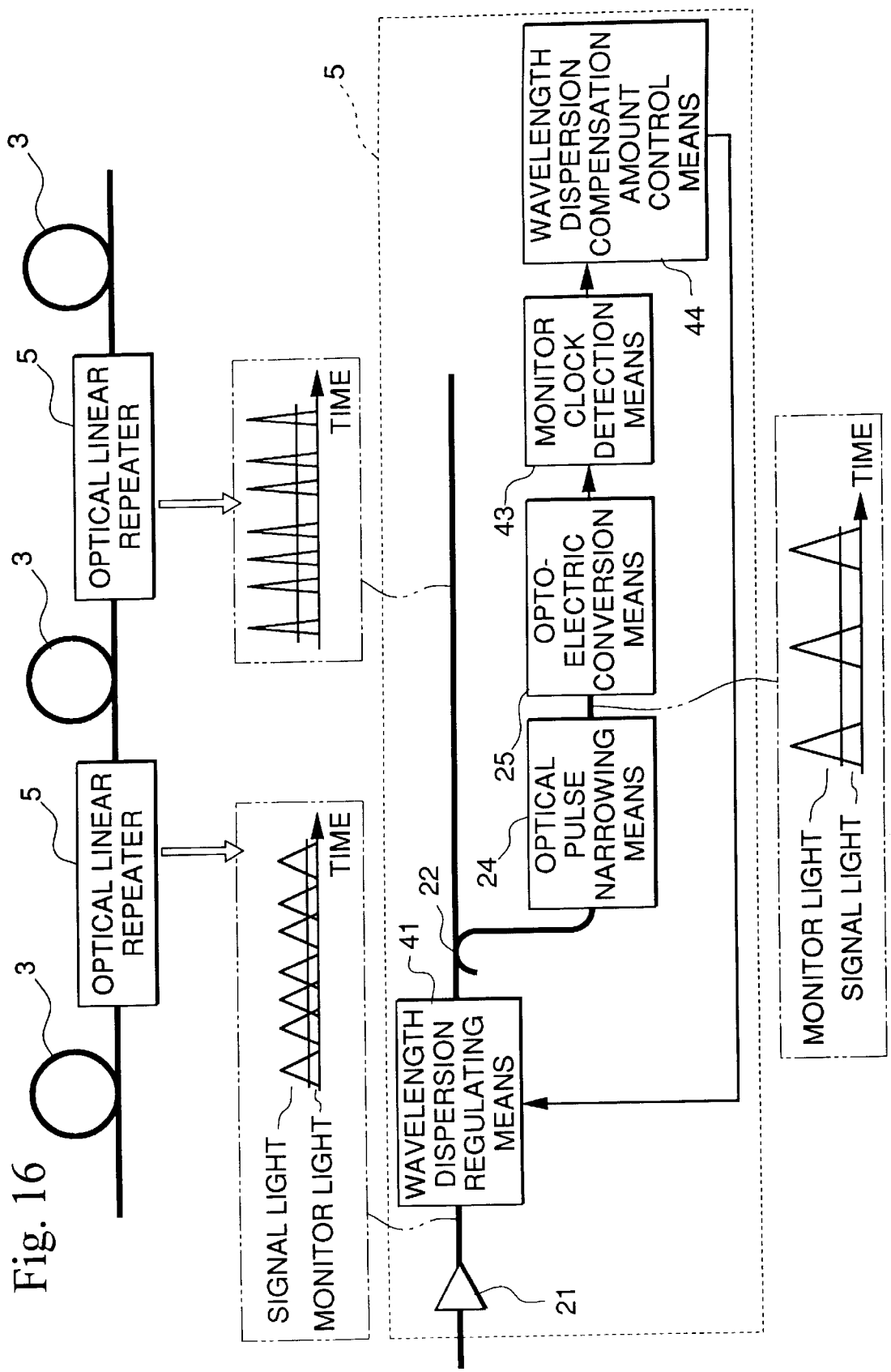
FIG. 16 is a block diagram showing a tenth embodiment of the optical transmission system of the present invention.

FIG. 16 shows a tenth embodiment of the optical transmission system of the present invention.

The present embodiment is characterized in carrying out wavelength dispersion compensation with an optical linear repeater 5 appropriately inserted on the optical transmission fiber 3 that connects the optical transmitter 1 and the optical receiver 2. In the optical linear repeater 5 of the present embodiment, the structure for carrying out wavelength dispersion compensation is the same as the optical receiver shown in the sixth embodiment. That is, it is structured by an optical amplifier 21, a wavelength dispersion adjustment means 41, an optical splitting means 22, an optical pulse narrowing means 24, an optoelectric conversion means 25, a monitor clock detection means 43, and a wavelength dispersion compensation amount control means 44, the monitor light having a broadened pulse width is restored to the original optical pulse train, and the wavelength dispersion compensation is controlled so that its clock component is maximized.

Moreover, as in the ninth embodiment, it is possible that an optical signal regeneration means is disposed before the optoelectric conversion means, and only the high level monitor light component is input into the monitor clock detection means 43.

Figure 17:
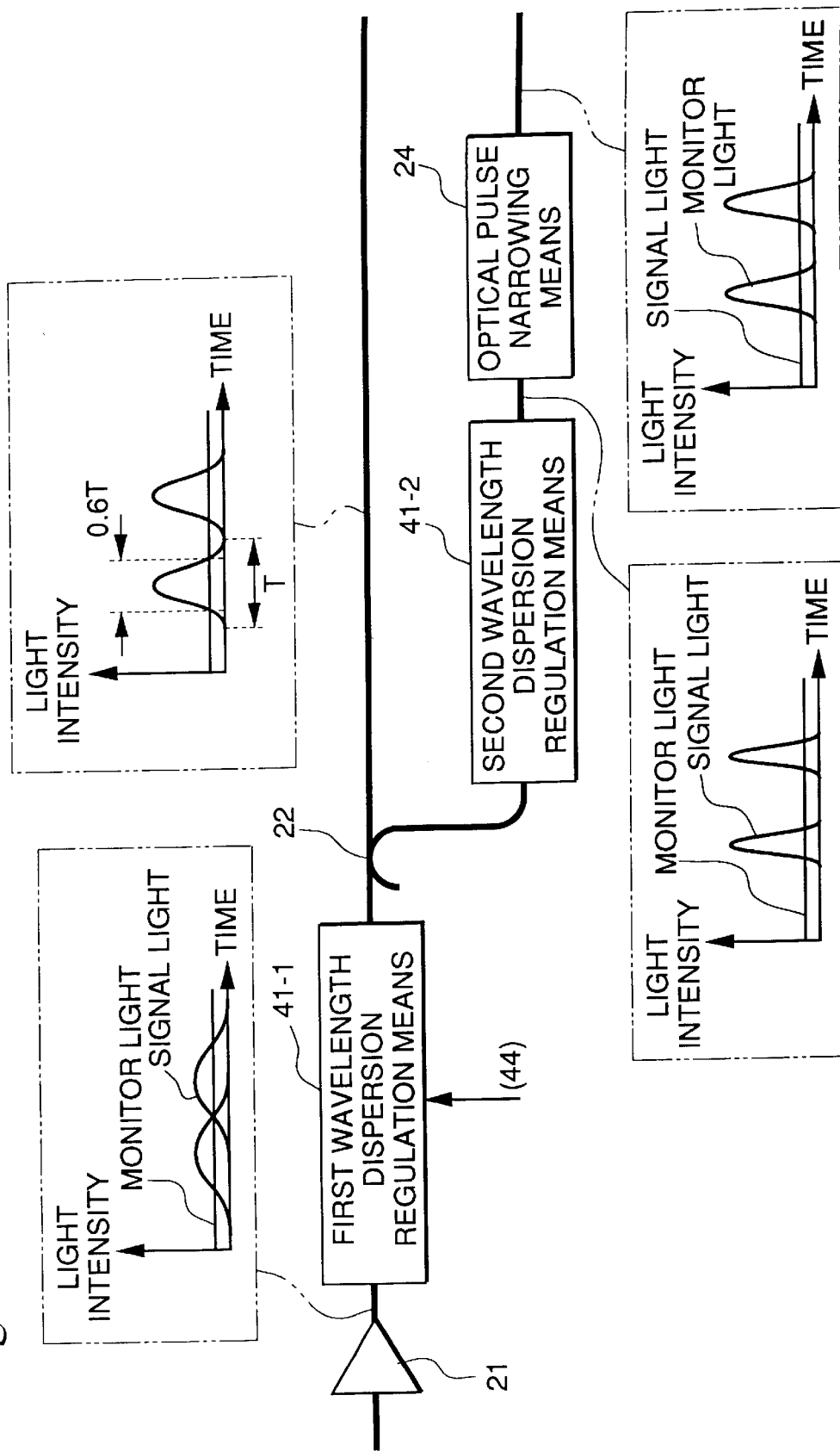
FIG. 17 is a drawing showing an example of the structure of the pre-broadening method in the tenth embodiment.
Figure 18:
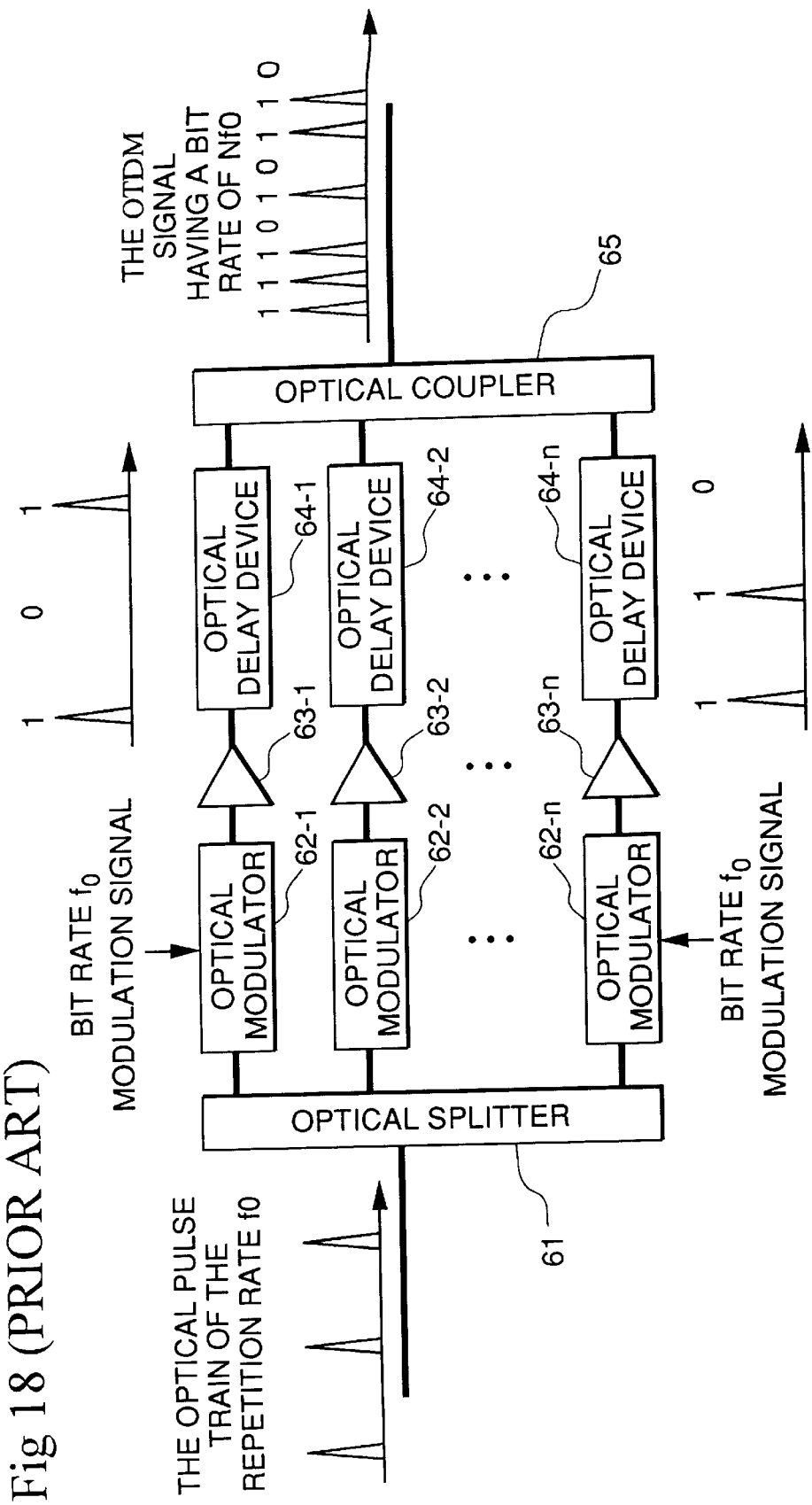
FIG. 18 shows an example of the structure (parallel type) of the time division multiplexing signal generation means.
Figure 20:
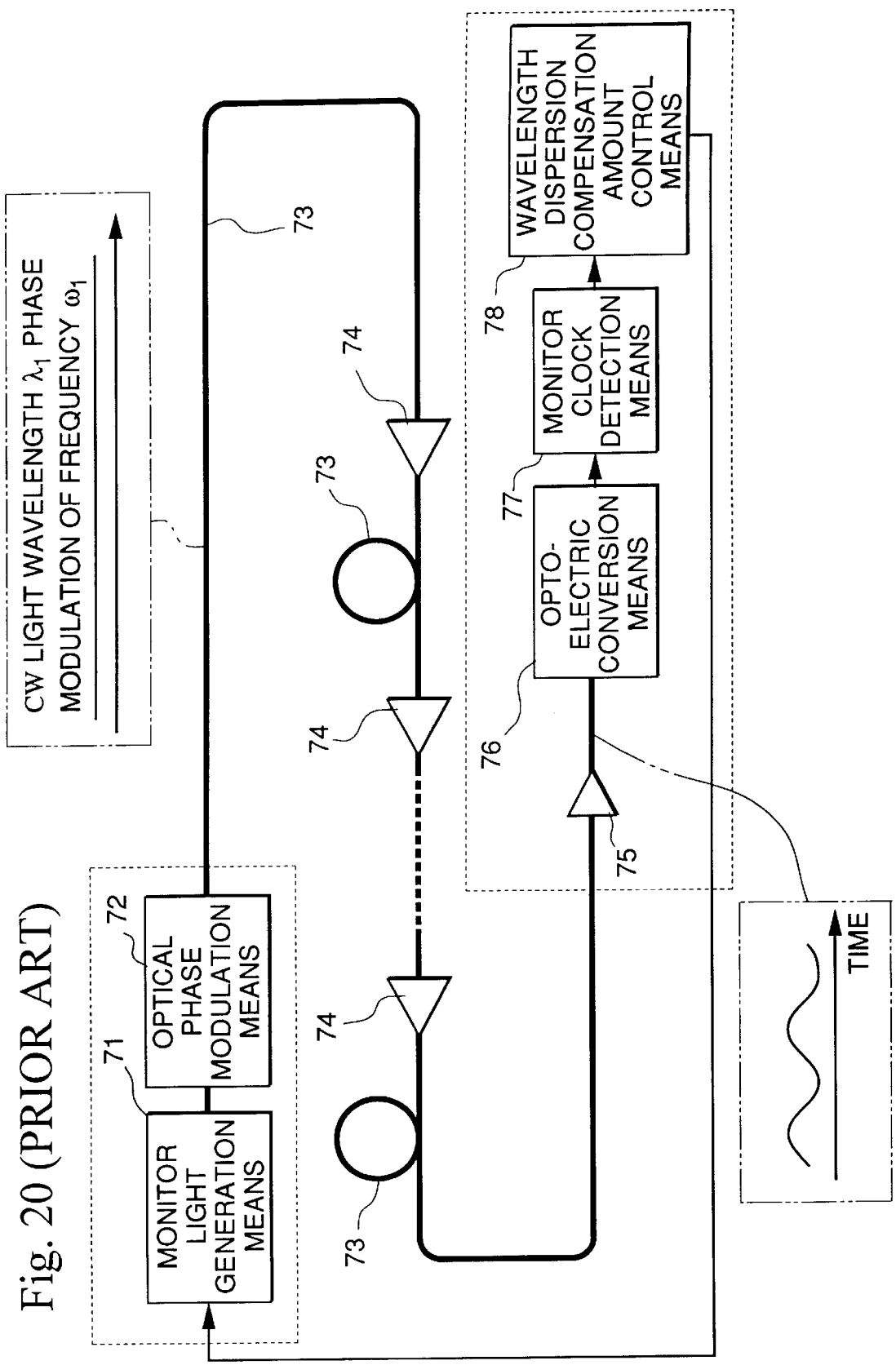
FIG. 20 is a block diagram showing a first example of a conventional structure that measures the wavelength dispersion of an optical transmission system.

In addition, as shown in FIG. 17, a first wavelength adjustment means 41-1 having a variable wavelength dispersion amount is provided before the optical splitting means 22, a second wavelength dispersion adjustment means 41-2 having a fixed wavelength dispersion amount is provided before the optical pulse narrowing means 24, and the wavelength dispersion compensation amount control means 44 controls the amount of wavelength dispersion compensation of the wavelength dispersion adjustment means 41-1 so that clock component of the monitor light that is dispersion compensated via the two wavelength dispersion adjustment means and restored to the optical pulse train by the optical pulse narrowing means 24 is maximized.

Here, it is possible to adapt a pre-broadening method (see Japanese Patent Application, No. Hei 10-135337, "Optical Linear Repeater System") that suppresses the peak intensity of the optical light delivered from the optical linear repeater 5 to the optical transmission fiber 3 by adjusting the signal light so that the pulse width is set to about 60% of the time slot. Thereby, it is possible to reduce the influence of nonlinear optical effects such as self-phase modulation and inter-bit four wave mixing between bits, and to implement long distance transmission.

Moreover, in the above-described optical receiver in the sixth, eighth, and ninth embodiments and in the above-described optical linear repeater 5 in the tenth embodiment, it is possible to switch the disposition of the optical amplifier 21 with the wavelength dispersion adjustment means 41.

In this connection, Japanese Unexamined Patent Application, First Publication, No. Hei 8-321805 ("Optical Transmission System, Optical Multiplexing Transmission System, and their Peripheral Technology") discloses technology wherein the control signal is superimposed on the main signal by amplitude modulation and phase modulation, and the wavelength compensation and channel identification are carried out using this control signal at the receiving side. In contrast, the optical transmission system of the present invention has a structure wherein the control light (or monitor light) is multiplexed with the OTDM signal (or the signal light) by the code division multiplexing format (CDM) or the dispersion division multiplexing format (DDM) and transmitted, the control light (monitor light) is extracted by selecting the code or amount of dispersion at the receiving side, and the control signal included therein as digital data is read. Thus, first, the multiplexing method of the control signal with respect to the main signal is different. Furthermore, in the optical transmission system of the present invention, the information of the frame header can be multiplexed with the main signal and transmitted, and it is possible to carry out control of, for example, forward error correction, which cannot be carried out from analog information, for example, of the clock or intensity fluctuations.

What is claimed is:

1. An optical transmission system that transmits to an optical receiver a signal light sent from an optical transmitter via a plurality of optical transmission fibers connected in serial and an optical linear repeater or an optical regenerator repeater, comprising:

an optical transmitter including:
an optical time division multiplexed signal generating means that outputs an optical time division multiplexed OTDM signal having a wavelength $\lambda_0$ that has a time division multiplexed signal light having N lines (N is an integer equal to or greater than 2) and having a bit rate $m_i f_0 (i=1, 2, \ldots, N$, where $m_1$ is an integer equal to or greater than 1) that is an integral multiple of a fundamental frequency $f_0$;
a control light generation means that generates control signal light wherein an optical pulse train, having a wavelength $\lambda_1$ equal or almost equal to the wavelength of the OTDM signal and having a bit rate $kf_0$ that is an integral multiple of the fundamental frequency $f_0$ that are synchronized with the OTDM signal, is modulated by control information of said OTDM signal;
an optical pulse broadening means that broadens the optical pulse waveform of the control signal in a time range, and outputs a control light having an optical peak intensity set sufficiently low in comparison to the OTDM signal peak intensity; and
an optical coupling means that multiplexes the OTDM signal and the control light and delivers them to the optical transmission fiber; and an optical receiver including:
a light splitting means that splits into two parts the transmitted light;
an optical pulse narrowing means that restores the control light that includes a part of the light split by the optical splitting means to the original optical pulse train;
an optoelectric conversion means that converts the output light of the optical pulse narrowing means to an electric signal;
a control signal processing means that extracts from the electrical signal information relating to the optical time division multiplexing of the OTDM signal and control information including a timing clock; and
an optical time division demultiplexing means that, depending on the control information, carries out optical time division demultiplexing of the OTDM signal into an N line signal light included in the other portion of light split by the optical splitting means.

2. An optical transmission system according to claim 1 wherein:
a part or all of a plurality of optical linear repeaters provide:
an optical splitting means that splits transmitted light into two parts;
a first optical signal regeneration means that regenerates the OTDM signal included in one part of the light split by the optical splitting means;
an optical pulse narrowing means that restores the control signal included in the other part of the light split by the optical splitting means to the original optical pulse train;
a second optical pulse regenerating means that regenerates the optical pulse train of the control light output from the optical pulse narrowing means;
an optical pulse broadening means that broadens the optical pulse waveform of the regenerated control light in a time range, and outputs the control light having an optical peak intensity set sufficiently low compared to the OTDM signal peak intensity; and
an optical coupling means that multiplexes the regenerated OTDM signal and the control light and delivers them to the optical transmission fiber.

3. An optical transmission system according to claim 1 wherein said control signal generation means is characterized in providing:
a pulse light source that generates an optical pulse train having a bit rate $kf_0$ that is an integral multiple of the fundamental frequency $f_0$ synchronous with said OTDM signal or a bit rate $f_0/k$ that is a unit fraction of an integral number of the fundamental frequency $f_0$ synchronous with said OTDM signal; and
an intensity modulator or a phase modulator that outputs the control light wherein said optical pulse train has been intensity modulated or phase modulated by control information.

4. An optical transmission means according to claim 1 wherein:
said control signal light generating means provides:
an optical splitting means that splits an optical pulse train having a fundamental frequency $f_0$ output from the light source of said optical time division multiplexed signal generating means;
a divider and a multiplier that output an optical pulse train having a repeating frequency $kf_0$ or $f_0/k$; and
an intensity modulator or a phase modulator that output control light wherein said optical pulse train has been intensity modulated or phase modulated.

5. An optical transmission system according to claim 1 wherein:
said control light that is generated by modulating said optical pulse train by control information that includes at least one of frame information of the time division multiplexing, multiplexed channel information, forward error connection information, or transmission quality monitoring information; and
said control signal processing means reads at least one of the frame information of the time division multiplexing, the multiplexed channel information, the forward error correction information, or the transmission quality monitoring information.

6. An optical transmission system according to claim 1 characterized in the polarization relationship between said OTDM signal and said control light being orthogonal while incident on said optical coupling means.

7. An optical transmission system according to claim 1 characterized in an optical signal regeneration means that outputs only the OTDM signal having a high optical peak intensity being provided before the optical time division separation means of said optical receiver.

8. An optical transmission system according to claim 1 characterized in an optical signal regeneration means that outputs only the control light signal having a high optical peak intensity being provided before the optoelectric conversion means of said optical receiver.

9. An optical transmission system that transmits to an optical receiving means a signal light sent from an optical transmitter via a plurality of optical transmission fibers connected in serial and an optical linear repeater, comprising:
   a signal generation means that generates signal light having a wavelength $\lambda_0$ and a bit rate $f_0$;
   a monitor light generating means that generates monitor light of an optical pulse train having a wavelength $\lambda_1$ equal to or almost equal to the wavelength of the signal light and having a repetition rate $f_1$;
   an optical pulse broadening means that outputs monitor light having an optical peak intensity set sufficiently low compared to the signal light peak intensity; and
   an optical coupling means that multiplexes signal light and monitor light output from the optical pulse broadening means and delivers the monitor light to the optical transmission fiber; and
   an optical receiver including:
      a wavelength dispersion adjustment means that provides wavelength dispersion to the delivered light;
      an optical splitting means that splits into two parts the output light of the wavelength dispersion adjustment means and outputs one part to a signal light processing means that carries out reception processing of the signal light;
      an optical pulse narrowing means that restores the monitor light included in the other part of the light split by the optical splitting means to the original pulse train;
      an optoelectric conversion means that converts the output light of the optical pulse narrowing means into an electric signal;
      a monitor clock detection means that detects a clock component of the monitor light from the electric signal; and
      a wavelength dispersion compensation amount control means that controls the wavelength dispersion compensation amount of the wavelength dispersion adjustment means so that the clock component is maximized.

10. An optical transmission system according to claim 9 characterized in a structure in which a wavelength dispersion compensation amount control means controls the wavelength of the signal light generating means and the monitor light generating means of the light transmitter so that the clock component detected by the monitor detection means is maximal, instead of providing a wavelength dispersion adjustment means in the optical receiver.

11. An optical transmission means according to claim 9 wherein
   a part or all of a plurality of optical linear repeaters providing:
      a wavelength dispersion adjustment means that provides wavelength dispersion to the delivered light;
      an optical splitting means that splits into two parts the output light of the wavelength dispersion adjustment means and outputs this part to the optical transmission fiber;
      an optical pulse narrowing means that restores the monitor light included in the other part of the light split by the optical splitting means to the original optical pulse train;
      an optoelectric conversion means that converts the output light of the optical pulse narrowing means into an electric signal;
      a monitor clock detection means that detects the clock component of the monitor light from the electric signal; and
      a wavelength dispersion compensation amount control means that controls the wavelength dispersion compensation amount of the wavelength dispersion adjustment means so that the clock component is maximal.

12. An optical transmission system according to claim 9 characterized in said monitor light generating means splitting the optical pulse train having a repetition rate $f_0$ output from the optical source of said signal light generating means, and using this optical pulse train or an optical pulse train having a repeating frequency $f_0/n$ with a $1/n$ cycle.

13. An optical transmission system according to claim 9 characterized in the polarization relationship between said signal light and said monitor light being orthogonal when incident on said optical coupling means.

14. An optical transmission system according to claim 9 characterized in said monitor clock detection means detecting the direct component and the repetition rate component ($f_1$) of the monitor light and its higher harmonic component ($Nf_1$, where N is an integer equal to or greater than 2), and outputting the ratio $P(f_1)/P(0)$ of the repetition rate component electrical power $P(f_1)$ and the direct current electrical power $P(0)$ or the ratio $P(Nf_1)/P(0)$ of the harmonic component electric power $(Nf_1)$ and the direct current electrical power $P(0)$.

15. An optical transmission system according to claim 9 characterized in providing an optical signal regenerating means that outputs only a high optical peak intensity before the signal light processing means of said optical receiver.

16. An optical transmission system according to any of claim 9 characterized in providing an optical signal regeneration means that outputs only monitor light having a high optical peak intensity before said optical receiver or the optoelectric conversion means of said optical linear repeater.

17. An optical transmission system according to claim 1 wherein:
   said optical pulse broadening means splits into a plurality of parts the optical frequency component of an optical pulse, applies phase modulation, intensity modulation, or phase modulation and intensity modulation of differing degree to each frequency component by phase modulation, intensity modulation, or phase modulation and intensity modulation set based on a certain fixed code sequence, and outputs a control light or monitor light whose waveform is broadened on the time axis by being multiplexed with each frequency component; and
   said optical pulse narrowing means divides into a plurality of parts the optical frequency component of said control light or monitor light, applies phase modulation, intensity modulation, or phase modulation and intensity modulation of differing degree to each frequency component by phase modulation, intensity modulation, or phase modulation and intensity modulation set based on a certain code sequence that is the reverse of that of said optical pulse broadening means, and outputs an optical pulse train whose optical waveform has returned to the original on the time axis by being multiplexed with each frequency component.

18. An optical transmission system according to claim 1 wherein:
   said optical pulse broadening means uses a first wavelength dispersion imparting means having a wavelength dispersion amount (D(ps/nm)) of only the sufficiently broadened pulse width of the optical pulse; and
   said optical pulse narrowing means uses a second wavelength dispersion imparting means having a wavelength dispersion amount (−D(ps/nm)) of a code that is the reverse of that of said optical pulse broadening means.

19. An optical transmission system according to claim 1 characterized in said optical receiver or said optical regenerator repeater providing:
   a wavelength dispersion adjustment means that applies wavelength dispersion to the transmitted light that is disposed before said optical splitting means;
   a monitor clock detection means that detects the clock component of said control light from the electric signal output from said optoelectric conversion means; and
   a wavelength compensation amount control means that controls the wavelength dispersion compensation amount so that said clock component is maximal.

20. An optical transmission system according to claim 4 wherein:
   said control light that is generated by modulating said optical pulse train by control information that includes at least one of the frame information of time division multiplexing, multiplexed channel information, forward error correction information, or transmission quality monitoring information; and
   said control signal processing means reads at least one of the frame information of the time division multiplexing, the multiplexed channel information, the forward error correction information, or the transmission quality monitoring information.

21. An optical transmission system according to claim 2 characterized in the polarization relationship between said OTDM signal and said control light being orthogonal while incident on said optical coupling means.

22. An optical transmission system according to claim 10 characterized in said monitor light generating means splitting the optical pulse train having a repetition rate $f_0$ output from the optical source of said signal light generating means, and using this optical pulse train or an optical pulse train having repeating frequency $f_0/n$ with a 1/n cycle.

23. An optical transmission system according to claim 10 characterized in the polarization relationship between said signal light and said monitor light being orthogonal when incident on said optical coupling means.

24. An optical transmission system according to claim 11 characterized in said monitor clock detection means detecting a direct component and a repetition rate component ($f_1$) of the monitor light and its higher harmonic component ($Nf_1$, where N is an inter equal or greater than 2), and outputting the ratio $P(f_1)/P(0)$ of the repetition rate component electrical power $P(f_1)$ and the direct current electrical power $P(0)$ or the ratio $P(Nf_1)/P(0)$ of the harmonic component electric power ($Nf_1$) and direct current electrical power $P(0)$.

25. An optical transmission system according to claim 10 characterized in providing an optical signal regenerating means that outputs only a high optical peak intensity before the signal light processing means of said optical receiver.

26. An optical transmission system according to claim 11 characterized in providing an optical signal regeneration means that outputs only monitor light having a high optical peak intensity before said optical receiver or the optoelectric conversion means of said optical linear repeater.

27. An optical transmission system according to claim 11 wherein:
   said optical pulse broadening means splits into a plurality of parts the optical frequency component of an optical pulse, applies phase modulation, intensity modulation, or phase modulation and intensity modulation of differing degree to each frequency component by phase modulation, intensity modulation, or phase modulation and intensity modulation set based on a certain fixed code sequence, and outputs a control light or monitor light whose waveform is broadened on the time axis by being multiplexed with each frequency component; and
   said optical pulse narrowing means divides into a plurality of parts the optical frequency component of said control light or monitor light, applies phase modulation, intensity modulation, or phase modulation and intensity modulation of differing degree to each frequency component by phase modulation, intensity modulation, or phase modulation and intensity modulation set based on a certain code sequence that is the reverse of that of said optical pulse broadening means, and outputs an optical pulse train whose optical waveform has returned to the original on the time axis by being multiplexed with each frequency component.

28. An optical transmission system according to claim 11 wherein:
   said optical pulse broadening means uses a first wavelength dispersion imparting means having a wavelength dispersion amount (D(ps/nm)) of only the sufficiently broadened pulse width of the optical pulse; and
   said optical pulse narrowing means uses a second wavelength dispersion imparting means having wavelength dispersion amount (−D(ps/nm)) of a code that is the reverse of that of said optical pulse broadening means.

29. An optical transmission system according to claim 2 characterized in said optical receiver or said optical regenerator repeater providing:
   a wavelength dispersion adjustment means that applies wavelength dispersion to the transmitted light that is disposed before said optical splitting means;
   a monitor clock detection means that detects the clock component of said control light from the electric signal output from said optoelectric conversion means; and
   a wavelength compensation amount control means that controls the wavelength dispersion compensation amount so that said clock component is maximal.

* * * * *